(12) United States Patent
Gotou

(10) Patent No.: US 11,649,365 B2
(45) Date of Patent: May 16, 2023

(54) INK, INK SET, INK CONTAINER, METHOD OF PRINTING, AND PRINTING DEVICE

(71) Applicant: RICOH COMPANY, LTD., Tokyo (JP)

(72) Inventor: Hiroshi Gotou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 17/366,763

(22) Filed: Jul. 2, 2021

(65) Prior Publication Data

US 2022/0017764 A1    Jan. 20, 2022

(30) Foreign Application Priority Data

Jul. 14, 2020    (JP) .............................. JP2020-120667

(51) Int. Cl.

| | | |
|---|---|---|
| *C09D 11/40* | (2014.01) | |
| *C09D 11/38* | (2014.01) | |
| *C09D 11/322* | (2014.01) | |
| *C09D 11/033* | (2014.01) | |
| *B41J 11/00* | (2006.01) | |
| *C09D 11/101* | (2014.01) | |
| *C09D 11/102* | (2014.01) | |
| *B41M 5/00* | (2006.01) | |
| *C09D 11/037* | (2014.01) | |

(52) U.S. Cl.
CPC ......... *C09D 11/40* (2013.01); *B41J 11/00214* (2021.01); *B41M 5/0023* (2013.01); *C09D 11/033* (2013.01); *C09D 11/037* (2013.01); *C09D 11/101* (2013.01); *C09D 11/102* (2013.01); *C09D 11/322* (2013.01); *C09D 11/38* (2013.01)

(58) Field of Classification Search
CPC ........... B41M 11/02214; B41M 5/0023; C09D 11/033; C09D 11/037; C09D 11/101; C09D 11/102; C09D 11/322; C09D 11/38; C09D 11/40
USPC ............................................. 522/84; 523/160
See application file for complete search history.

(56) References Cited

U.S. PATENT DOCUMENTS

| | | | | |
|---|---|---|---|---|
| 6,743,514 | B1 * | 6/2004 | Samaranayake | ......... B41M 5/52 524/832 |
| 8,188,160 | B2 * | 5/2012 | Hirato | ................. C09D 11/322 523/160 |
| 8,408,692 | B2 * | 4/2013 | Hirato | ................. C09D 11/322 347/100 |
| 8,932,687 | B2 * | 1/2015 | Hayata | .................... B29C 59/02 522/74 |
| 10,113,078 | B2 * | 10/2018 | Katoh | ................. C09D 11/033 |
| 2007/0229637 | A1 * | 10/2007 | Makuta | ................ C09D 11/101 347/100 |

(Continued)

FOREIGN PATENT DOCUMENTS

| | | |
|---|---|---|
| JP | 2004-002668 | 1/2004 |
| JP | 2013-123852 | 6/2013 |

(Continued)

*Primary Examiner* — Sanza L. McClendon
(74) *Attorney, Agent, or Firm* — Grüneberg and Myers PLLC

(57) ABSTRACT

An ink contains an anionic compound, water, a photoacid generator, and one or more organic solvents containing at least one organic solvent having a solubility parameter of from 9 to 11.8 $(J/cm^3)^{1/2}$.

17 Claims, 2 Drawing Sheets

(56) References Cited

U.S. PATENT DOCUMENTS

| | | | |
|---|---|---|---|
| 2008/0071007 A1* | 3/2008 | Spinelli | C09D 11/326 |
| | | | 347/100 |
| 2011/0205289 A1* | 8/2011 | Irita | C09D 11/101 |
| | | | 522/175 |
| 2012/0028002 A1* | 2/2012 | Yokoi | C09D 7/69 |
| | | | 522/46 |
| 2012/0176456 A1* | 7/2012 | Maekawa | C08F 2/50 |
| | | | 347/102 |
| 2013/0155145 A1 | 6/2013 | Gotou et al. | |
| 2013/0257034 A1* | 10/2013 | Shimohara | C09D 11/30 |
| | | | 347/102 |
| 2013/0323474 A1 | 12/2013 | Gotou et al. | |
| 2014/0204156 A1 | 7/2014 | Gotou | |
| 2016/0333208 A1 | 11/2016 | Gotou et al. | |
| 2018/0105711 A1* | 4/2018 | Katoh | C09D 11/326 |
| 2020/0392359 A1* | 12/2020 | Sato | B41J 2/01 |

FOREIGN PATENT DOCUMENTS

| | | |
|---|---|---|
| JP | 2013-248763 | 12/2013 |
| JP | 2014-140993 | 8/2014 |
| JP | 2016-216701 | 12/2016 |
| WO | WO2019/188522 A1 | 10/2019 |

\* cited by examiner

INK, INK SET, INK CONTAINER, METHOD OF PRINTING, AND PRINTING DEVICE

CROSS-REFERENCE TO RELATED APPLICATIONS

This patent application is based on and claims priority pursuant to 35 U.S.C. § 119 to Japanese Patent Application No. 2020-120667, filed on Jul. 14, 2020, in the Japan Patent Office, the entire disclosure of which is hereby incorporated by reference herein.

BACKGROUND

Technical Field

The present disclosure relates to an ink, an ink set, an ink container, a method of printing, and a printing device.

Description of the Related Art

Inkjet recording methods have become rapidly popular because they can readily form color images with low running cost. However, they involve problems of image deficiencies such as ink blurring depending on a combination of ink and recording media, which significantly degrades the quality of images. Moreover, there remain various challenges for improving productivity and performance for inkjet.

Such challenges include violent image blurring caused by color bleeding, unequalized image density of solid images, and failure of fixing images on non-permeable media for signage because they little absorb ink. Image blurring caused by color bleeding, unequalized image density of solid images, and a decrease in image density also occur when printing on coated paper for commercial printing or publication printing containing fillers such as calcium carbonate and kaolin as coated layer material.

SUMMARY

According to embodiments of the present disclosure, provided is an ink that contains an anionic compound, water, a photoacid generator, and one or more organic solvents containing at least one organic solvent having a solubility parameter of from 9 to 11.8 $(J/cm^3)^{1/2}$.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
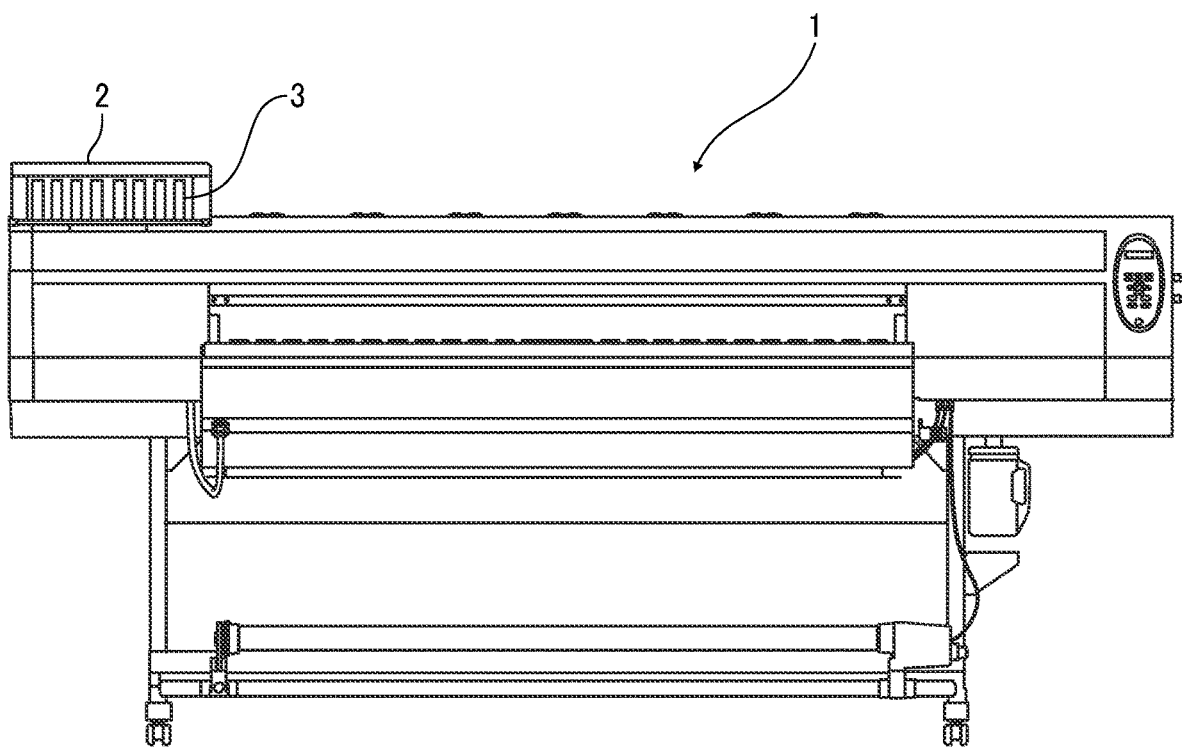
FIG. 1 is a schematic diagram of a front view illustrating an example of the printing device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an ink is provided which can prevent beading and color bleed on printed images.

Ink

The ink of the present disclosure contains an anionic compound, water, a photoacid generator, and one or more organic solvents containing at least one organic solvent having a solubility parameter of from 9 to 11.8 $(J/cm^3)^{1/2}$, and other optional components.

In classic technologies, beading and color bleeding occur to images printed on never or little permeable media during high performance printing.

When images are printed on recording media with the ink of the present disclosure containing an anionic compound, water, an organic solvent, and a photoacid generator, the photoacid generator is decomposed upon application of suitable ultraviolet radiation immediately after the printing. An acid is produced upon the decomposition of the photoacid generator, which aggregates and/or thickens the anionic compound (at least one of an anionic resin and anionic pigment). Owing to such thickened or aggregated anionic compound, beading and color bleeding of printed images during high performance printing can be prevented.

Photoacid Generator

The photoacid generator decomposes and produces an acid upon application of ultraviolet radiation. It is preferably either the compound represented by Chemical Formula I and the compound represented by Chemical Formula II.

Compound Represented by Chemical Formula I

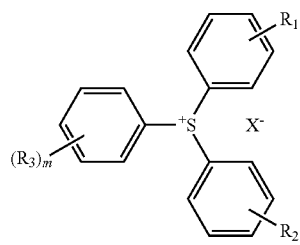

Chemical Formula I

In Chemical Formula I, $R_1$, $R_2$, and $R_3$ each, independently represent hydrogen atoms, alkyl groups having one to four carbon atoms, alkoxy groups having one to four carbon atoms, or thiophenyl groups. A symbol "m" represents zero or an integer of from 1 to 3. The counter ion $X^-$ represents $F_3CSO_3^-$, $F_9C_4SO_3^-$, $CH_3C_6H_4SO_3^-$, $PF_6^-$, $SbF_6^-$, $(Rf)_nPF_{6-n}^-$, 10- camphor $SO_3^-$, or $B(C_6F_5)_4^-$, where Rf represents a fluoroalkyl carbide group and n represents an integer of from 1 to 5, The compound represented by Chemical Formula I preferably includes the following compound represented by Chemical Formula I-1.

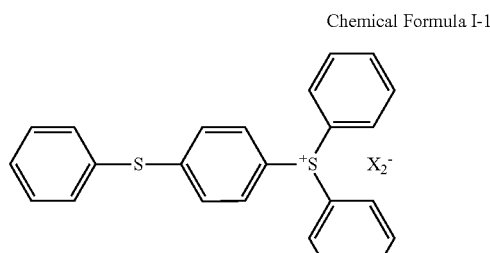

Chemical Formula I-1

In Chemical Formula I-1, $X_2^-$ represents $PF_6^-$, $SbF_6^-$, or $(RF)_nPF_{6-n}^-$. RF represents a fluoroalkyl carbide group and n represents an integer of from 1 to 5.

The compound represented by Chemical Formula I-1 includes the compound represented Chemical Formula 1 to Chemical Formula 3 below

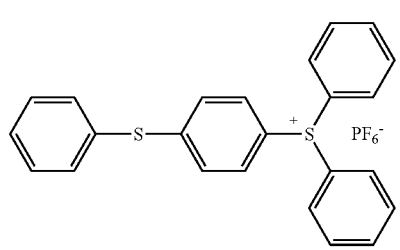

Chemical Formula 1

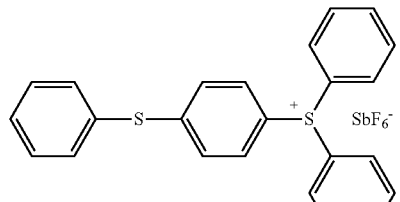

Chemical Formula 2

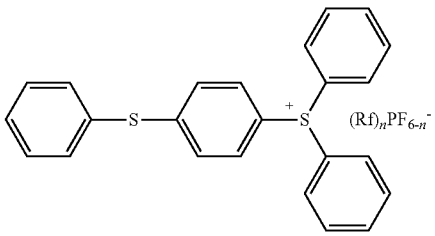

Chemical Formula 3

Rf represents a fluoroalkyl carbide group and n represents an integer of from 1 to 5.

The compound represented by Chemical Formula I-1 can be procured.

Specific examples include, but are not limited to, CPI-1 OOP, CPI-101A, CPI-200A, and CPI0210S, all manufactured by San-Apro Ltd.

The compound represented by Chemical Formula I preferably includes the following compound represented by Chemical Formula I-2.

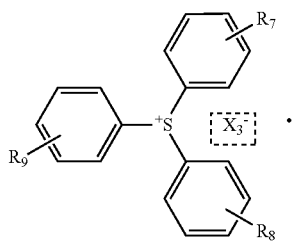

Chemical Formula I-2

In Chemical Formula I-2, $R_7$, $R_8$, and $R_9$ each, independently represent hydrogen atoms or alkyl group having one to four carbon atoms. $X_3^-$ represents $F_3CSO_3^-$. $F_9C_4SO_3^-$, 10-camphor $SO_3^-$, $B(C_6F_5)_4^-$, or $(Rf)_nPF_{6-n}^-$. Rf represents an fluoroalkyl carbide group and n represents an integer of from 1 to 5.

The compound represented by Chemical Formula I-2 includes the compound represented Chemical Formula 4 to Chemical Formula 6 below.

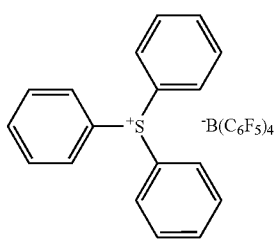

Chemical Formula 4

Chemical Formula 5

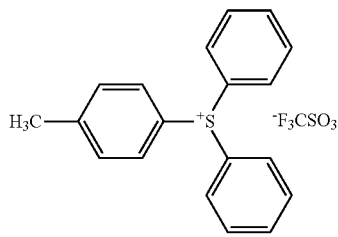

Chemical Formula 6

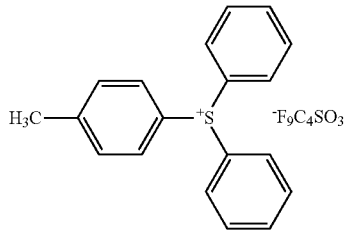

The compound represented by Chemical Formula I-2 can be procured.

Specific examples include, but are not limited to, CPI-310B and CPI-410S, both manufactured by San-Apro Ltd., TPS-TF, TPS-PFBS, and TPS-CS, all manufactured by Toyo Gosei Co., Ltd., and WPAG-336, WPAG-469, and WPAG-638, all manufactured by FUJIFILM Wako Pure Chemical Corporation.

The compound represented by Chemical Formula I preferably includes the following compound represented by Chemical Formula I-3 below.

Chemical Formula I-3

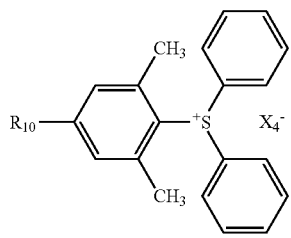

In Chemical Formula I-3, $R_{10}$ represents a methyl group or a methoxy group. $X_4^-$ represents $F_3CSO_3^-$ or $CH_3C_6H_4SO_3^-$.

The compound represented by Chemical Formula I-3 includes the compound represented Chemical Formula 7 and Chemical Formula 8 below Chemical Formula 7

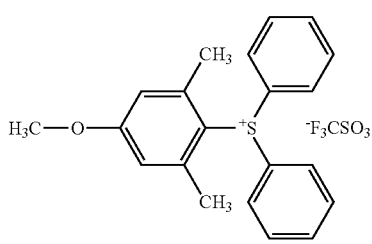

Chemical Formula 8

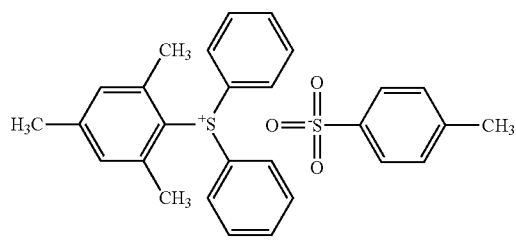

The compound represented by Chemical Formula I-3 can be procured.

Specific examples include, but are not limited to, WPAG-367 and WPAG-370, both manufactured by FUJIFILM Wako Pure Chemical Corporation.

Compound Represented by Chemical Formula II

Chemical Formula II

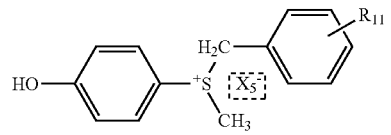

In Chemical Formula II, $R_4$ represents a hydrogen atom or alkyl group having 1 to 4 carbon atoms. $R_5$ represents a hydrogen atom, an alkyl group having one to four carbon atoms, a phenyl group, a substituted phenyl group, or a naphthalene group. $R_6$ represents a hydrogen atom, an alkyl group having one to four carbon atoms, an acetyl group, or a methoxy carbonyl group. The counter ion $X_1^-$ represents $PF_6^-$, $SbF_6^-$, or $B(C_6F_5)_4^-$.

The compound represented by Chemical Formula II preferably includes the following compound represented by Chemical Formula II-1 below.

Chemical Formula II-1

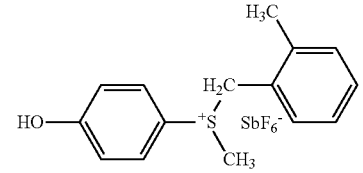

In Chemical Formula II-1, $R_{11}$ represents a hydrogen atom or an alkyl group having one to four carbon atoms. The counter ion $X_5^-$ represents $PF_6^-$, $SbF_6^-$, or $B(C_6F_5)_4^-$.

The compound represented by Chemical Formula II-1 includes the compound represented Chemical Formula 9 and Chemical Formula 10 below.

Chemical Formula 9

Chemical Formula 10

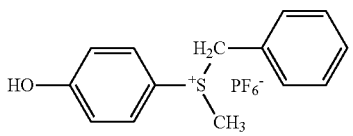

The compound represented by Chemical Formula II-1 can be procured.

Specific examples include, but are not limited to, San-Aid SI-80, San-Aid SI-100, and San-Aid SI-110, all manufactured by SANSHIN CHEMICAL INDUSTRY CO., LTD.

The compound represented by Chemical Formula II preferably includes the following compound represented by Chemical Formula II-2 below.

Chemical Formula II-2

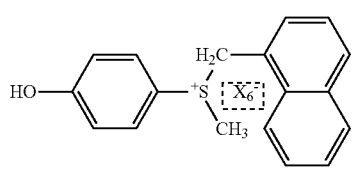

In Chemical Formula II-2, the counter ion $X_6^-$ represents $PF_6^-$, $SbF_6^-$, or $B(C_6F_5)_4^-$.

Specific examples of the compounds represented by Chemical Formula II-2 include the compound represented by Chemical Formula 11.

Chemical Formula 11

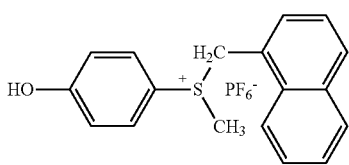

The compound represented by Chemical Formula II-2 can be procured.

Specific examples include, but are not limited to, San-Aid SI-60 and San-Aid SI-360, both manufactured by SANSHIN CHEMICAL INDUSTRY CO., LTD.

The compound represented by Chemical Formula II preferably includes the following compound represented by Chemical Formula II-3.

Chemical Formula II-3

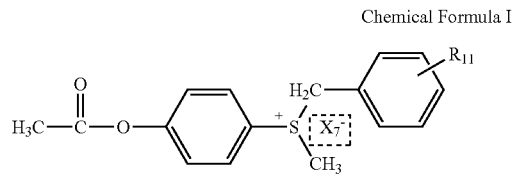

In Chemical Formula II-3, $R_{11}$ represents a hydrogen atom or an alkyl group having one to four carbon atoms. A counter ion $X_7^-$ represents $PF_6^-$, $SbF_6^-$, or $B(C_6F_5)_4^-$.

Specific examples of the compounds represented by Chemical Formula II-3 include the compound represented by Chemical Formula 12.

Chemical Formula 12

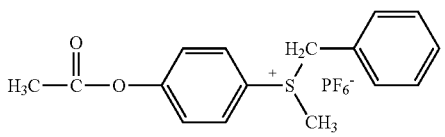

Chemical Formula 13

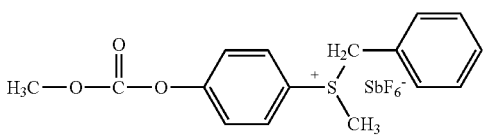

Chemical Formula 14

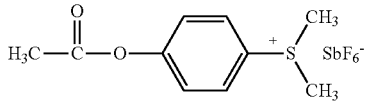

The compound represented by Chemical Formula II-3 can be procured.

Specific examples include, but are not limited to, San-Aid SI-300, San-Aid SI-B2A, and San-Aid SI-B3A, all manufactured by SANSHIN CHEMICAL INDUSTRY CO., LTD.

The proportion of the photoacid generator is preferably from 0.25 to 5 percent by mass and more preferably 0.5 to 4 percent by mass to the total content of ink to minimize color bleeding and beading.

A proportion of the photoacid generator of 0.25 percent by mass or greater achieves good anti-beading and anti-color bleeding effects. A proportion of the photoacid generator of 0.25 percent by mass or less achieves good effect.

Organic Solvent

The organic solvent contains at least one organic solvent having a solubility parameter of from 9 to 11.8 $(J/cm^3)^{1/2}$ It is particularly preferable to contain at least one organic solvent having a solubility parameter of from 9 to less than 11.8 $(J/cm^3)^{1/2}$.

Specific example of the organic solvent having a solubility parameter of from 9 to 11.8 $(J/cm^3)^{1/2}$ include, but are not limited to, 3-ethyl-3-oxetane methanol (SP value of 11.31 $(J/cm^3)^{1/2}$), 3-methyl-3-oxetane methanol (SP value of 11.79 $(J/cm^3)^{1/2}$), 3-methoxy-N,N-dimethyl propionamide (SP value of 9.19 $(J/cm^3)^{1/2}$), 3-butoxy-N,N-dimethyl propionamide (SP value of 9.09 $(J/cm^3)^{1/2}$), 1,2-hexane diol (SP value of 11.80 $(J/cm^3)^{1/2}$), 2-ethyl-1,3-hexane diol (SP value of 11.07 $(J/cm^3)^{1/2}$), 2,2,4-trimethylol-1,3-pentane diol (SP value of 11.19 $(J/cm^3)^{1/2}$), diethylene glycol monoethyl ether (SP value of 10.14 $(J/cm^3)^{1/2}$), 3-methoxy-1-butanol (SP value of 9.64 $(J/cm^3)^{1/2}$), 3-methoxy-3-methyl-1-butanol (SP value of 9.64 $(J/cm^3)^{1/2}$), 3-methoxy-3-methyl-1-butanol (SP value of 9.64 $(J/cm^3)^{1/2}$), methyl propylene triglycol (SP value of 9.43 $(J/cm^3)^{1/2}$). Diethylene glycol mono-n-butyl ether (SP value of 9.86 $(J/cm^3)^{1/2}$), diethylene glycol monomethylether (SP value of 10.34 $(J/cm^3)^{1/2}$), triethylene glycol monomethylether (SP value of 10.12 $(J/cm^3)^{1/2}$), propylene glycol monopropylether (SP value of 9.82 $(J/cm^3)^{1/2}$), propylene propylene glycol monomethylether (SP value of 10.19 $(J/cm^3)^{1/2}$), propylene glycol monobutylether (SP value of 9.69 $(J/cm^3)^{1/2}$), 3-methoxy-1-butanol (SP value of 10.65 $(J/cm^3)^{1/2}$), 3-methoxy-1-propanol (SP value of 10.41 $(J/cm^3)^{1/2}$), dipropylene glycol monomethylether (SP value of 9.84 $(J/cm^3)^{1/2}$), and 3-methyl-1.5-pentane diol (SP value of 11.80 $(J/cm^3)^{1/2}$). These can be used alone or in combination.

The proportion of the organic solvent having a solubility parameter of from 9 to 11.8 $(J/cm^3)^{1/2}$ to the total amount of ink is preferably from 5 to 60 percent by mass and more preferably from 10 to 30 percent by mass to achieve good coloring, anti-color bleeding, and anti-beading.

The ink of the present disclosure may contain a polyol as humectant having an equilibrium moisture content of 30 percent by mass or more at a temperature of 23 degrees C. and a relative humidity of 80 percent as an organic solvent other than the organic solvent having a solubility parameter of from 9 to 11.8 $(J/cm^3)/2$. Of these, polyols having a high equilibrium moisture and a boiling point (bp) are preferable.

Specific examples of the polyol include, but are not limited to, diethylene glycol (bp of 245 degrees C., equilibrium moisture content of 43 percent by mass), triethylene glycol (bp of 285 degrees C., equilibrium moisture content of 39 percent by mass), tetraethylene glycol (bp of from 324 to 330 degrees C., equilibrium moisture content of 37 percent by mass), 1,3-butane diol (bp of from 203 to 204 degrees C., equilibrium moisture content of 35 percent by mass), glycerin (bp of 290 degrees C., equilibrium moisture content of 49 percent by mass), diglycerin (bp of 270 degrees C./20 hPa, equilibrium moisture content of 38 percent by mass), 1,2,3-butanetriol (bp of 175 degrees C./33 hPa, equilibrium moisture content of 38 percent by mass), and 1,2,4-butanetriol (bp of from 190 to 191 degrees C./24 hPa, equilibrium moisture content of 41 percent by mass). These can be used alone or in combination. Of these, glycerin and 1,3-butanediol are preferable.

A petri dish on which one gram of each organic solvent is placed is preserved in a desiccator in which the temperature and the relative humidity are respectively maintained at 22 to 24 degrees C. and 77 to 83 percent RH to measure the equilibrium moisture content, using a saturated aqueous solution of potassium chloride and sodium chloride. The equilibrium moisture content is calculated utilizing the following relation:

Equilibrium moisture content(percent)=[moisture content absorbed in organic solvent/(amount of organic solvent+moisture content absorbed in organic solvent)]×100

Specific examples of the organic solvents other than the organic solvent having a solubility parameter of from 9 to 11.8 $(J/cm^3)^{1/2}$ and the polyol having an equilibrium moisture content of 30 percent by mass or more at a temperature of 23 degrees C. and a relative humidity of 80 percent include, but are not limited to, 2-methyl-1,3-butane diol (bp of 214 degrees C.), 3-methyl-1,3-butane diol (bp of 203 degrees C.), dipropylene glycol (bp of 232 degrees C.), 1,5-pentane diol (bp of 242 degrees C.), propylene glycol (bp of 187 degrees C.), 2-methyl-2,4-pentane diol (bp of 197 degrees C.), ethylene glycol (bp of from 196 to 198 degrees C.), tripropylene glycol (bp of 267 degrees C.), hexylene glycol (bp of 197 degrees C.), polyethylene glycol (sticky liquid to solid), polypropylene glycol (bp of 187 degrees C.), 1,6-hexane diol (bp of from 253 to 260 degrees C.), 1,2,6-hexane triol (bp of 178 degrees C.), trimethyl ethane (solid, melting point of from 199 to 201 degrees C.), and trimethylol propane (solid, melting point of 61 degrees C.).

The total proportion of the organic solvent to the total amount of ink is preferably from 10 to 75 percent by mass and more preferably from 15 to 50 percent by mass.

A total proportion of 10 percent by mass or less ameliorate the moisturizing effect of ink. A total proportion of 75 percent by mass or less improves the drying property of ink on a recording medium and the quality of text on plain paper.

The organic solvent relates to minimizing color bleeding and beading. It is preferable to use the organic solvent in a suitable range because it also contributes to securing discharging stability and prevention of fixation of waste ink onto a maintaining device of an ink discharging device.

The ink may contain a water-soluble organic solvent other than the organic solvent mentioned above.

Specific examples of the water-soluble organic solvent include, but are not limited to, polyol aryl ethers, nitrogen-containing heterocyclic compounds, amides, amines, sulfur-containing compounds, propylene carbonates, ethylene carbonates, and other humectants.

Specific examples of the polyol include, but are not limited to, 2-methyl-1,3-butmane diol (bp of 214 degrees C.), 3-methyl-1,3-butane diol (bp of 203 degrees C.), dipropylene glycol (bp of 232 degrees C.), 1,5-pentane diol (bp of 242 degrees C.), propylene glycol (bp of 187 degrees C.), 2-methyl-2,4-pentane diol (bp of 197 degrees C.), ethylene glycol (bp of from 196 to 198 degrees C.), tripropylene glycol (bp of 267 degrees C.), hexylene glycol (bp of 197 degrees C.), polyethylene glycol (sticky liquid to solid), polypropylene glycol (bp of 187 degrees C.), 1,6-hexane diol (bp of from 253 to 260 degrees C.), 1,2,6-hexane triol (bp of 178 degrees C.), trimethyl ethane (solid, melting point of from 199 to 201 degrees C.), and trimethylol propane (solid, melting point of 61 degrees C.).

Other preferable humectants are sugar groups.

Sugar groups include monosaccharides, disaccharides, oligosaccharides (including triaccharides and tetrasaccharides), and polysaccharides.

Specific examples of sugar groups include, but are not limited to, glucose, mannose, fructose, ribose, xylose, arabinose, galactose, maltose, cellobiose, lactose, saccharose, trehalose, and maltotriose.

Polysaccharides represent sugar in a broad sense and contain materials that are present widely in nature, for example, α-cyclodextrine and cellulose.

Specific examples of derivatives of these sugar groups include, but are not limited to, reducing sugars (for example, sugar alcohols (represented by $HOCH_2(CHOH)_nCH_2OH$, where "n" represents an integer of from 2 to 5) of the sugar groups specified above, oxidized sugars (e.g., aldonic acid and uronic acid), amino acid, and thio acid.

Of these, sugar alcohols are preferable. Specific examples include, but are not limited The mass ratio of the coloring material to the water-soluble organic solvent has a great impact on the discharging stability of ink discharged from an inkjet head and also prevention of fixation of waste ink in the maintenance unit in an ink discharging device.

If the ratio of the water-soluble organic solvent is small while the ratio of the solid coloring material has a large proportion, water evaporation around the ink meniscus of the nozzle tends to be accelerated, thereby causing poor discharging performance.

Anionic Compound

Anionic resin and/or anionic pigments are used as the anionic compound.

Resin

Resin having anionic property is usable. Anionic water dispersible resin is preferable.

Water-Dispersible Resin

As the water-dispersible resin, a resin having excellent film-forming (image forming) property, chemical resistance, water-resistance, and weather resistance is suitable for image recording of strong water-resistance and high image density (high coloring property). For example, condensation-based synthetic resins, addition-based synthetic resins, and natural polymers are suitable. Of these, polyurethane resins are preferable.

It is necessary to select a material for the water-dispersible resin particle and increase the amount added as the anionic compound since the non-permeable medium for signage has poor ink fixability. Further, polyurethane resin particles synthesized from a polyol material containing an aromatic ring having a structure represented by Chemical Formula A illustrated below are widely used in order to improve the fixability to film of a non-permeable medium.

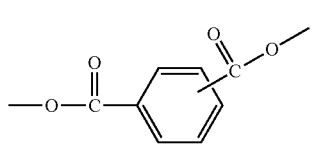

Chemical Formula A

Specific examples of the raw material of polyol containing an aromatic ring having a structure represented by Chemical Formula A include, but are not limited to, terephthalic acid and isophthalic acid. Terephthalic acid or isophthalic acid used as a raw material produces a cyclic ester compound. When the two types of raw materials mentioned above are used, the production of a mixed cyclic ester of the two types of phthalic acid is confirmed by GC-MS.

It is preferable that a polyol raw material containing an aromatic ring having a structure represented by Chemical Formula A be used as the raw material of the polyurethane resin particle to contain a polyurethane resin having a structure represented by Chemical Formula A.

The ratio of the polyol raw material containing an aromatic ring having the structure represented by Chemical Formula A in the polyurethane resin particle having the structure represented by Chemical Formula A is about a half of the polyol. In the polyurethane resin, it is preferably about 10 to about 30 percent. When the ratio of the polyol raw material is in the range specified above, alcohol resistance is excellent.

Specific examples of the other condensation-based synthetic resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based synthetic resins include, but are not limited to, polyolefin resins, polystyrene-based resins, polyvinyl alcohol-based resins, polyvinyl ester-based resins, polyacrylic acid-based resins, and unsaturated carboxylic acid-based resins. Specific examples of the natural polymer include, but are not limited to, celluloses, rosins, and natural rubber.

Of these, polyurethane resin particle is preferable to enhance the fixability of ink. The water-dispersible resin can be used alone or in combination.

As the water-dispersible resin, it is possible to use a self-dispersible resin having a hydrophilic group thereby having self-dispersibility and a resin having no dispersibility while dispersibility is imparted by a surfactant or a resin having a hydrophilic group. Of these, emulsions of resin particles obtained by emulsification polymerization or suspension polymerization of ionomers or unsaturated monomers of a polyester resin or polyurethane resin are most suitable.

In the case of emulsification polymerization of an unsaturated monomer, since an unsaturated monomer, a polymerization initiator, a surfactant, a chain transfer agent, a chelate agent, a pH regulator, etc. are added in water to conduct reaction to obtain a resin emulsion, it is easy to obtain a water-dispersible resin and change the resin components. Therefore, a water-dispersible resin having target properties is easily obtained.

Since, for a water-dispersible resin, dispersion breakage or cleavage of molecular chains such as hydrolysis is caused in a strong alkali or strong acid environment, pH is preferably from 4 to 12, more preferably from 7 to 11, and furthermore preferably from 8 to 10.5 in terms of the miscibility with the water-dispersible colorant.

In addition, the water-dispersible resin fixes the water-dispersible colorant on media and forms a film at room temperature or higher to improve the fixability of the colorant. Therefore, the minimum film-forming temperature (FT) of the water-dispersible resin is preferably 100 degrees C. or lower.

In addition, when the glass transition temperature of the water-dispersible resin is −40 degrees C. or lower, viscosity of the resin film increases, thereby causing tackiness to printed matter. Therefore, the glass transition temperature of the water-dispersible resin is preferably −30 degrees C. or higher. The proportion of the water-dispersible resin in ink is preferably from 0.5 to 20 percent by mass and more preferably from 1 to 15 percent by mass.

However, taking into account the fixability of the colorant to a non-permeable medium for signage or commercial printing paper, it is preferable that the proportion of the polyurethane resin particles in ink be 3 percent by mass or more. The ratio of the colorant to the polyurethane resin particle be from 1.0:2.0 to 1.0:12.0 and particularly preferably from 1.0:2.0 to 1.0:11.0 in solid mass. Polyurethane resin particles are used in liquid dispersion to prepare ink. The proportion of the polyurethane resin particle in ink means the proportion of the polyurethane resin particle in solid mass in ink.

Coloring Material

The ink of the present disclosure can be clear ink without containing a coloring material; it is, however, preferable to contain a coloring material.

There is no particular limit to the coloring material. Pigments having anionic property are preferable.

Anionic pigments include a surfactant dispersion pigment in which a pigment is dispersed by a surfactant, a resin dispersion pigment in which a pigment is dispersed by a resin, a resin coverage dispersion pigment in which the surface of a pigment is covered with a resin, and a self-dispersion pigment in which a hydrophilic group is provided to the surface of a pigment. Pigments having water dispersibility are suitable. Of these, it is good to use a resin coverage pigment or self dispersion pigment having at least one hydrophilic group on its surface.

Specific examples of such hydrophilic groups include, but are not limited to, —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM$_2$. These hydrophilic groups can be introduced by known methods.

The counter ion M is preferably a quaternary ammonium ion. Specific examples include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion. Of these, tetraethyl ammonium ion, tetrabutyl ammonium ion, and benzyl trimethyl ammonium ion are preferable and tetrabutyl ammonium ion is particularly preferable.

The ink using the pigment mentioned above particularly has excellent storage stability over time and an increase in viscosity during moisture vaporing is reduced. This is because even when moisture is evaporated from water rich ink so that the ink becomes organic solvent rich, dispersion of a pigment is inferred to be kept stable by the hydrophilic group having a quaternary ammonium ion.

A polymer emulsion having a polymer particulate including a pigment can be preferably used as the coloring material other than the pigment having the hydrophilic group. The pigment can be encapsulated in a polymer particulate or adsorbed to the surface thereof. In this case, it is not necessary that all the pigments are encapsulated or adsorbed. The pigments may be partially dispersed in an emulsion.

Specific examples of the polymer for polymer particulate include, but are not limited to, vinyl-based polymers, polyester-based polymers, and polyurethane-based polymers. Of these, the vinyl-based polymers and the polyester-based polymers are particularly suitable. Specific example are disclosed in, for example, JP-2000-53897-A1 and JP-2001-139849-A1.

In addition, typical organic pigments and complex pigments covering inorganic pigment particles with an organic pigment or carbon black can be used. The complex pigment can be manufactured by a method including precipitating organic pigments under the presence of inorganic pigments, a mechanochemical method including mechanically mixing and grinding inorganic pigments and organic pigments, etc. Optionally, it is possible to provide an organosilane compound layer formed of polysiloxane and alkylsilane between inorganic pigments and organic pigments to improve attachability between them.

The mass ratio of the inorganic pigment particle to the organic pigment of a colorant or carbon black is preferably from 3:1 to 1:3 and more preferably from 3:2 to 1:2. When the ratio of the colorant is in the range mentioned above, the color developability and coloring power do not decrease and the transparency and color tone do not deteriorate.

Specific examples of the complex pigments commercially available include, but are not limited to, silica/carbon black complex material, silica/phthalocyanine complex material (PB15:3), silica/disazo yellow complex material, and silica/quinacridone complex material (PR122) (manufactured by TODAKOGYO CORP.) because these have small primary particle diameters.

When inorganic pigment particles having a primary particle diameter of 20 nm are covered with an equivalent amount of an organic pigment, the primary particle diameter of the pigment is about 25 nm. If a suitable dispersant is used to disperse the pigment to the degree of the primary particle, it is possible to manufacture ultrafine pigment dispersion ink having a dispersion particle diameter of 25 nm. With regard to the complex material, the organic pigment on the surface thereof contributes to dispersion and the feature of the inorganic pigment disposed in the center of the complex material demonstrates through the thin layer of the organic pigment having a thickness of about 2.5 nm. Therefore, a pigment dispersant capable of stably dispersing both at the same time has to be selected.

Specific examples of the inorganic pigments include, but are not limited to, titanium oxide, iron oxide, calcium oxide, barium sulfate, aluminum hydroxide, barium yellow, cadmium red, chrome yellow, and carbon black. Of these, carbon black is preferable.

Carbon black can be manufactured by a known method such as a contact method, a furnace method, and a thermal method.

Specific examples include, but are not limited to, channel black, furnace black, gas black, and lamp black.

Specific examples of the organic pigments include, but are not limited to, azo pigments, polycyclic pigments, dye chelate, nitro pigments, nitroso pigments, and aniline black. Of these, azo pigments and polycyclic pigments are preferable.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments.

The dye chelate includes, but are not limited to, basic dye type chelate, and acidic dye type chelate.

Specific examples of the organic pigment include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 139, 150, 151, 153, 155, 180, 183, 185 and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

The BET specific surface area of the pigment is preferably from 10 to 1,500 m$^2$/g, more preferably from 20 to 600 m$^2$/g, and particularly preferably from 50 to 300 m$^2$/g.

If a pigment does not have such a suitable BET specific surface area, the pigment is subjected to typical size reduction treatment or pulverization treatment (for example, a ball mill pulverization, a jet mill pulverization, or ultrasonic wave treatment) to obtain a relatively small particle diameter.

The 50 percent cumulative volume particle diameter ($D_{50}$) of the colorant is preferably from 10 to 200 nm in ink.

The proportion of the colorant to the entire ink is preferably from 1 to 15 percent by mass and more preferably from 1.5 to 10 percent by mass in solid mass. When the proportion is not less than 1 percent by mass, the coloring of the ink and the image density are improved. When the proportion is not greater than 15 percent by mass, the ink does not become sticky so that the discharging property does not deteriorate. This proportion is preferable in terms of economy.

Dyes can be added to adjust color tone. However, it should be used within a range having no adverse impact on weather resistance.

Water

As the water, pure water and hyper pure water such as deionized water, ultrafiltered water, reverse osmosis water, and distilled water can be used.

The proportion of water in the ink is not particularly limited and can be suitably selected to suit to a particular application. In terms of drying and discharging reliability of the ink, the proportion is preferably from 10 to 90 percent by mass and more preferably from 20 to 60 percent by mass.

The clear ink preferably contains a surfactant.

Surfactant

In the present disclosure, it is preferable to use at least one of a polyether-modified siloxane compound, an acetylene glycol surfactant, and an acetylene alcohol surfactant to decrease the dynamic surface tension of ink to 34.0 mN/m or less at a surface life of 15 msec as measured by maximum bubble pressure technique at 25 degrees and keep the static surface tension of the ink not less than 20.0 mN at 25 degrees C. Owing to such a surfactant, ink is not readily wet on a head nozzle plate ink repelling film so that defective discharging caused by ink attachment to a nozzle can be prevented and discharging stability is improved. Ink is not readily attached to the surface of a nozzle ink repelling film which tends to create a problem; the ink is free of defective discharging.

Of these, it is preferable to select surfactants represented by Chemical Formula IV to Chemical Formula VII. In particular, substances having a low dynamic surface tension, a high permeability, and an excellent leveling property are preferable while not degrading dispersion stability irrespective of the type of water-dispersible colorants and the combinational use of organic solvents.

These surfactants can be used alone or in combination.

Chemical Formula IV

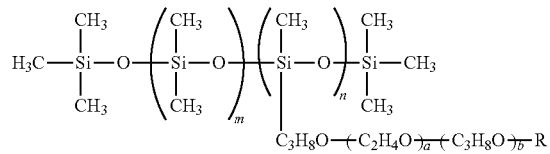

In Chemical Formula IV, R represents a hydrogen atom or an alkyl group having 1 to 4 carbon atoms, m represents 0 or an integer of from 1 to 23, n represents an integer of from 1 to 10, a represents an integer of from 1 to 23, and b represents 0 or an integer of from 1 to 23.

Chemical Formula V

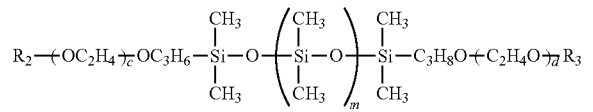

In Chemical Formula V, $R_2$ and $R_3$ each, independently represent hydrogen atoms or alkyl groups having 1 to 4 carbon, m represents an integer of from 1 to 8, c and d each, independently represent integers of from 1 to 10.

Chemical Formula VI

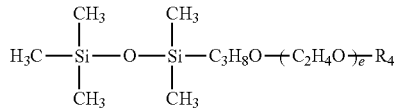

In Chemical Formula VI, $R_4$ represents a hydrogen atom or an alkyl group having 1 to 4 carbon atoms and e represents an integer of 1 to 8.

Chemical Formula VII

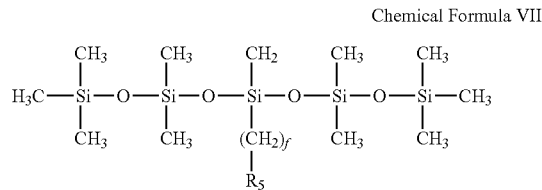

In Chemical Formula VII, $R_5$ represents a polyether group represented by following Chemical Formula C and f represents an integer of from 1 to 8.

Chemical Formula C

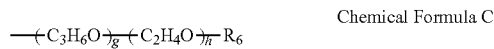

In Chemical Formula C, $R_6$ represents a hydrogen atom or an alkyl group having 1 to 4 carbon atoms, g represents 0 or an integer of from 1 to 23, h represents 0 or an integer of from 1 to 23, excluding the case where g and h are 0 at the same time.

Specific examples of the compound represented by Chemical Formula IV illustrated above include, but are not limited to, compounds represented by the following Chemical Formulae 7 to 14.

Chemical Formula 7

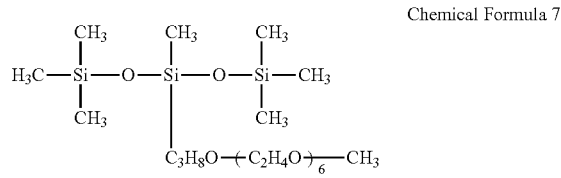

Chemical Formula 8

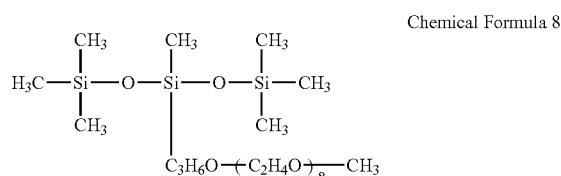

Chemical Formula 9

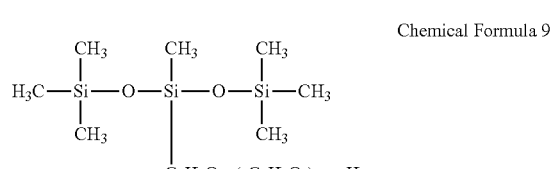

Chemical Formula 10

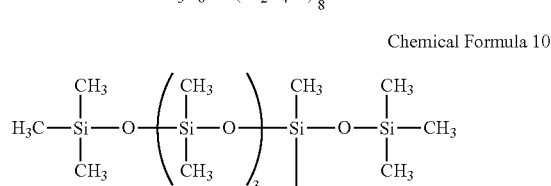

Chemical Formula 11

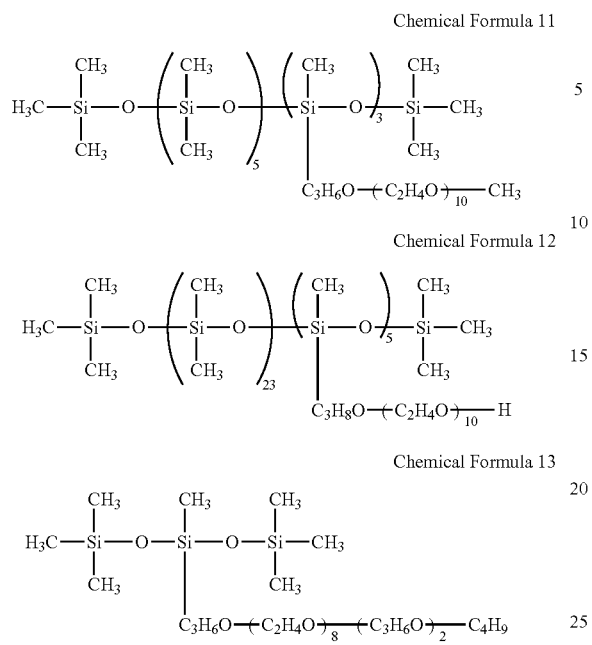

Chemical Formula 12

Chemical Formula 13

Chemical Formula 14

Specific examples of the compounds represented by Chemical Formula V include, but are not limited to, the compound represented by Chemical Formula 15.

Chemical Formula 15

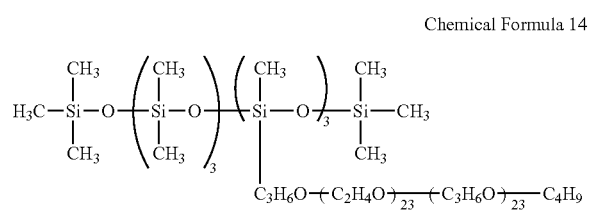

Specific examples of the compounds represented by Chemical Formula VI include, but are not limited to, the compound represented by Chemical Formula 16.

Chemical Formula 16

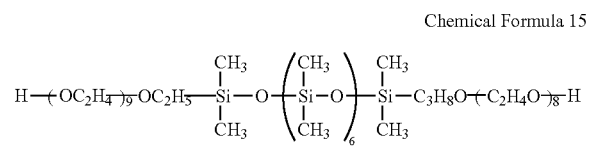

Specific examples of the compound represented by the Chemical Formula VII include, but are not limited to, compounds represented by the following Chemical Formulae 17 to 19.

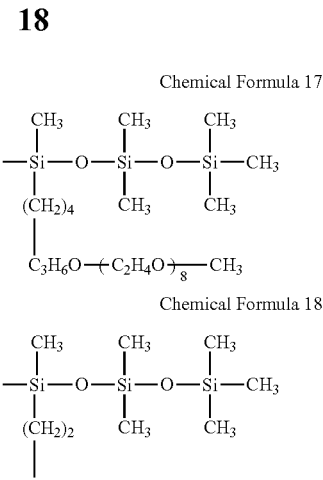

Furthermore, specific examples of procurable polyether-modified siloxane compound demonstrating the same effect as the above-mentioned compound include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, and FZ-2123, FZ-2191, all manufactured by Dow Corning Toray Co., Ltd., TSF4440, TSF4441, TSF4445, TSF4446, TSF4450, TSF4452, and TSF4460, all manufactured by Momentive Performance Materials Inc., SILFACE SAG002, SILFACE SAG003, SILFACE SAG005, SILFACE SAG503A, SILFACE SAG008, and SILFACE SJM0063, all manufactured by Nisshin Chemical Co., Ltd., TEGO Wet KL245, TEGO Wet250, TEGO Wet260, TEGO Wet 265, TEGO Wet 270, and TEGO Wet 280, all manufactured by Evonik Industries AG, and BYK-345, BYK-347, BYK-348, BYK-375, and BYK-377, all manufactured by BYK Japan KK.

Acetylene glycol surfactant or acetylene alcohol surfactant is procurable. Specific examples include, but are not limited to, Surfynol 104, Surfynol 104E, Surfynol 420, Surfynol 440, Surfynol 465, Surfynol SE, Surfynol SEF, Surfynol PSA-336, Surfynol DF110D, Surfynol DF58, Olfin E1004, Olfin E1010, Olfin E1020, Olfin PD-001, Olfin PD-002W, Olfin PD-004, Olfin PD-005, Olfin EXP.4001, Olfin EXP. 4200, Olfin EXP.4123, and Olfin EXP.4300 (all manufactured by Nissin Chemical co., ltd.).

Fluorochemical surfactants and silicon-based surfactants other than the polyether-modified siloxane compound, acetylene glycol surfactant, and acetylene alcohol surfactant mentioned above can be optionally used in combination.

The proportion of the surfactant to the entire ink is preferably from 0.001 to 5 percent by mass and more preferably from 0.5 to 3 percent by mass. A proportion of 0.001 percent by mass or more has a good impact on the effect of a surfactant. However, when the proportion is not less than 5 percent by mass, the addition impact is saturated; increasing the proportion furthermore is meaningless.

Other Components

There is no specific limitation to the addition of the other components including known additives. For example, foam inhibitors (defoaming agent), pH regulators, preservatives and fungicides, chelate reagents, corrosion inhibitors, anti-oxidants, ultraviolet absorbers, oxygen absorbers, and photostabilizing agents can be added.

Defoaming Agent

A minor amount of a foam inhibitor is added to ink to prevent foaming in the ink. Foaming means that liquid forms a thin film enclosing air. The properties such as surface tension and viscosity of ink relate to formation of foams. That is, a force to make the surface area as least as possible is applied to the liquid such as water having a high surface tension so that no or little foaming occurs. Conversely, ink having a high viscosity and high permeation property tends to foam because the surface tension thereof is low so that the foam formed due to viscosity of the liquid is easily maintained and does not easily break.

Normally, foam inhibitors locally lower the surface tension of bubble film or foam inhibitors insoluble in a foaming agent is dotted on the surface of the foaming agent to break the bubble. When a polyether-modified siloxane compound surfactant capable of extremely reducing the surface tension as the surfactant and a foam inhibitor of the former mechanism is used, it is not possible to locally reduce the surface tension of a bubble film. Therefore, the latter foam inhibitor insoluble in a foaming liquid is used. However, ink stability deteriorates due to this foam inhibitor insoluble in the solution.

To the contrary, the foam inhibitor represented by the following Chemical Formula IX is well compatible with the surfactant although the foam inhibitor is less able to reduce the surface tension than the polyether-modified siloxane compound surfactant. Therefore, the defoaming agent is efficiently taken in by the foam film, so that the surface of the foam film becomes an unequilibrium state locally due to the difference of the surface tension between the surfactant and the defoaming agent.

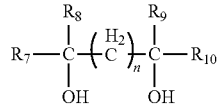

Chemical Formula IX

In Chemical Formula IX, $R_7$ and $R_8$ each, independently represent alkyl groups having 3 to 6 carbon atoms, $R_9$ and $R_{10}$ each, independently represent alkyl groups having one or two carbon atoms, and n represents an integer of from one to six.

Specific examples of the compound represented by Chemical Formula IX include, but are not limited to, 2,4,7,9-tetramethyldecane-4,7-diol and 2,5,8,11-tetramethyldodecane-5,8-diol. Considering the ability of reducing foams and compatibility with ink, 2,5,8,11-tetramethyldodecane-5,8-diol is particularly preferable.

The proportion of the defoaming agent in ink is preferably from 0.01 to 10 percent by mass and more preferably from 0.1 to 5 percent by mass. When the proportion is not less than 0.01 percent by mass, the defoaming effect is satisfactory. When the proportion is not greater than 10 percent by mass, the defoaming effect does not hit the peak or ink properties such as viscosity and particle diameter is not adversely affected.

pH Regulator

There is no specific limitation to the pH regulator capable of adjusting the pH of prescribed ink to be from 7 to 11 without having an adverse impact on the ink. It can be suitably selected to suit to a particular application.

Specific examples include, but are not limited to, alcohol amines, hydroxides of alkali metal elements, ammonium hydroxides, phosphonium hydoxides, and carbonates of alkali metal elements.

When the pH is outside the range of from 7 to 11, an inkjet head or an ink supplying unit tends to be significantly dissolved, which may lead to problems such as modification, leakage, poor discharging performance of ink.

Specific examples of the alcohol amines include, but are not limited to, diethanolamine, triethanolamine, and 2-amino-2-ethyl-1,3-propanediol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide.

Specific examples of the carbonates of alkali metal elements include, but are not limited to, lithium carbonate, sodium carbonate, and potassium carbonate.

It is preferable to use a strong basic compound and more preferable to select potassium hydroxide and sodium hydroxide. It is also preferable to use 2-amino-2-ethyl-1,3-propane diol as a pH regulator.

Preservatives and Fungicides

Specific examples of the preservatives and fungicides include, but are not limited to, dehydrosodium acetate, sodium sorbinate, sodium 2-pyridine thiol-1-oxide, sodium benzoate, and pentachlorophenol sodium.

Chelate Reagent

Specific examples of the chelate reagents include, but are not limited to, ethylene diamine sodium tetraacetate, nitrilo sodium triacetate, hydroxyethylethylene diamine sodium tri-acetate, diethylenetriamine sodium quinternary acetate, and uramil sodium diacetate.

Corrosion Inhibitor

Specific examples of the corrosion inhibitor include, but are not limited to, acid sulfite, thiosodium sulfate, antimony thioglycollate, diisopropyl ammonium nitrite, pentaerythritol tetranitrate, and dicyclohexyl ammonium nitrite.

Anti-oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbent include, but are not limited to, a benzophenone-based ultraviolet absorbent, a benzotriazole-based ultraviolet absorbent, a salicylate-based ultraviolet absorbent, a cyanoacrylate-based ultraviolet absorbent, and a nickel complex salt-based ultraviolet absorbent.

Manufacturing of Ink

The ink of the present disclosure can be manufactured by dispersing or dissolving an anionic compound, water, an organic solvent, a photoacid generator, and other optional components such as a colorant in an aqueous medium followed by stirring and mixing to obtain a mixture and heating the mixture in a temperature range of from 40 to lower than 70 degrees C. for six or more hours. Instruments such as a sand mill, homogenizer, ball mill, paint shaker, and ultrasonic dispersing agent can be used for dispersing and dissolving. For stirring and mixing, a stirrer having a classic stirring wing, a magnetic stirrer, a high speed dispersing device can be used.

Ink Properties

The properties of the ink of the present disclosure is not particularly limited and can be suitably selected to suit to a particular application.

When the static surface tension of ink is not less than 20 mN/m and the dynamic surface tension thereof is 34 mN/m or less at a bubble life time of 15 msec as measured by maximum bubble pressure technique, wettability of the ink to a recording medium is sufficiently secured. However, the ink is not wettable to the nozzle plate repelling film of an inkjet head and discharging stability can be secured so that the ink is extremely stable.

Viscosity of the ink at 25 degrees C. is preferably from 5 to 25 mPa·s and more preferably from 6 to 20 mPa·s. An ink viscosity of 5 mPa·s or greater enhances the printing density and text quality of ink. An ink viscosity of 25 mPa·S or less secures ink dischargeability.

Viscosity can be measured by an instrument such as a viscometer (RE-85L, manufactured by TOKI SANGYO CO., LTD.) at 25 degree C.

The pH is preferably from 8 to 10 and more preferably from 8.5 to 10 in order to ensure storage stability of ink.

Ink Set

The ink set of the present disclosure contains at least two inks selected from the group consisting of a cyan ink, magenta ink, yellow ink, and black ink, wherein each of the cyan ink, magenta ink, yellow ink, and black ink is the ink of the present disclosure.

Multiple color images can be recorded with an ink set having at least two types of such colors. Full color images can be formed with an ink set having all the colors.

Ink Container

The ink of the present disclosure can be accommodated in a container such as an ink cartridge.

The ink container of the present disclosure contains the ink of the present disclosure in a UV protection container.

To protect the container from UV radiation, it is possible to use a plastic container (ink cartridge) including an ink pack filled with ink, which is made of aluminum laminate or an aluminum deposited film.

Recording Medium

There is no specific limitation to the recording medium on which recording is possible using the ink of the present disclosure. The recording medium can be suitably selected to suit to a particular application. Such media include plain paper, gloss paper, special paper, cloth, film, transparent sheets, and print sheet for general purpose. However, the ink of the present disclosure is excellent in terms that quality printing with this ink is possible even on non-permeable printing media for signage and commercial printing paper as well as other kinds of paper.

Good images can be formed on little or never permeable recording media with the ink of the present disclosure.

Little or never permeable media have a surface with low moisture permeability and low absorbency. It includes a material having many hollow spaces inside that are not open to the outside. To be more quantitative, the media has a water absorbency of 10 mL/m$^2$ or less within 30 msec$^{1/2}$ of the contact of the ink according to Bristow's method.

The media include, but are not limited to, plastic films such as vinyl chloride resin film, polyethylene terephthalate (PET) film, polypropylene film, polyethylene film, and polycarbonate film.

Printed Matter

Printed matter having an image formed with the ink of the present disclosure is high quality, free of image blurring and has excellent stability over time so that it can be suitably used as references for various purposes on which text and images are printed.

Method of Printing and Printing Device

The method of printing of the present disclosure includes an application process, ultraviolet application process, and other optional processes.

The printing device of the present disclosure includes an application device, an ultraviolet application device (irradiator), and other optional devices.

Application Process and Application Device

In the application process, the ink of the present disclosure is applied onto a recording medium by the application device.

The method of applying ink is not particularly limited. Specific examples include, but are not limited to, an inkjet printing method, blade coating method, gravure coating method, gravure offset coating method, bar coating method, roll coating method, knife coating method, air knife coating method, comma coating method, U comma coating method, AKKU coating method, smoothing coating method, micro gravure coating method, reverse roll coating method, four roll coating method, five roll coating method, dip coating method, curtain coating method, slide coating method, and die coating method. Of these, an inkjet method is preferable.

Ultraviolet Application Process and Ultraviolet Irradiator

The ultraviolet application process includes irradiating applied in with ultraviolet radiation or exposing applied ink to ultraviolet radiation and executed by the ultraviolet irradiator.

The ultraviolet irradiator includes an ultraviolet lamp that applies stable exposure energy of ultraviolet radiation in a particular wavelength range and a filter that lets ultraviolet having the particular wavelength range pass through.

The ultraviolet lamp includes a mercury lamp, metal halide lamp, electrodeless lamp, excimer laser, ultraviolet laser, cold cathode fluorescent lamp, hot cathode fluorescent lamp, black light, and light emitting diode (LED). Band-like metal halide lamps, cold cathode fluorescent lamps, hot cathode fluorescent lamps, mercury lamp, and black light are preferable.

The amount of ultraviolet irradiation is preferably from 1 to 3,000 mJ and more preferably from 500 to 2,000 mJ.

Other Processes and Other Devices

One of the other optional processes is a drying process.

One of the other optional devices is a drying device.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the recording device and the recording method respectively represent a device capable of discharging ink and liquids such as various processing fluids to a recording medium and a method of recording utilizing such a device. The recording medium means an item to which ink or various processing fluids can be temporarily or permanently attached.

The recording device may further optionally include a device relating to feeding, conveying, and ejecting a recording medium and other devices referred to as a pre-processing device, a post-processing device in addition to the head portion to discharge the ink.

The recording device and the recording method may further optionally include a heating device (heater) for use in the heating process and a drying device (drier) for use in the drying process. The heating device and the drying device heat and dry the image surface and the opposite surface of a recording medium. The heating device and the drying device are not particularly limited. Devices such as a infrared drier, microwave drier, roll heater, drum heater, and heated wind can dry recording media. Drying and heating can be conducted before, in the middle of, or after printing. It is preferable to emit ultraviolet radiation at the same time of heating and drying.

In addition, the recording device and the recording method are not limited to those producing meaningful visible images such as text and figures with ink. For example, the recording method and the recording device capable of producing patterns like geometric design and 3D images are included.

In addition, the recording device includes both a serial type device in which the discharging head moves and a line type device in which the discharging head is not moved, unless otherwise specified.

Furthermore, in addition to the desktop type, this recording device includes a device capable of printing images on a wide recording medium such as A0 and a continuous printer capable of using continuous paper reeled up in a roll form as recording media.

Figure 2:
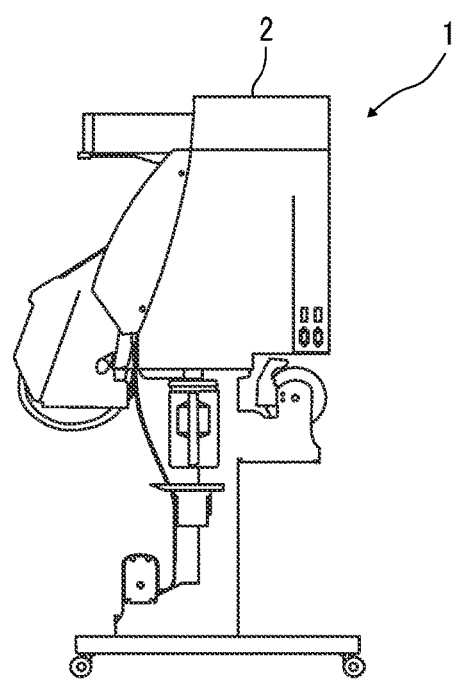
FIG. 2 is a schematic diagram illustrating an example of the printing device according to an embodiment of the present disclosure.
Figure 3:
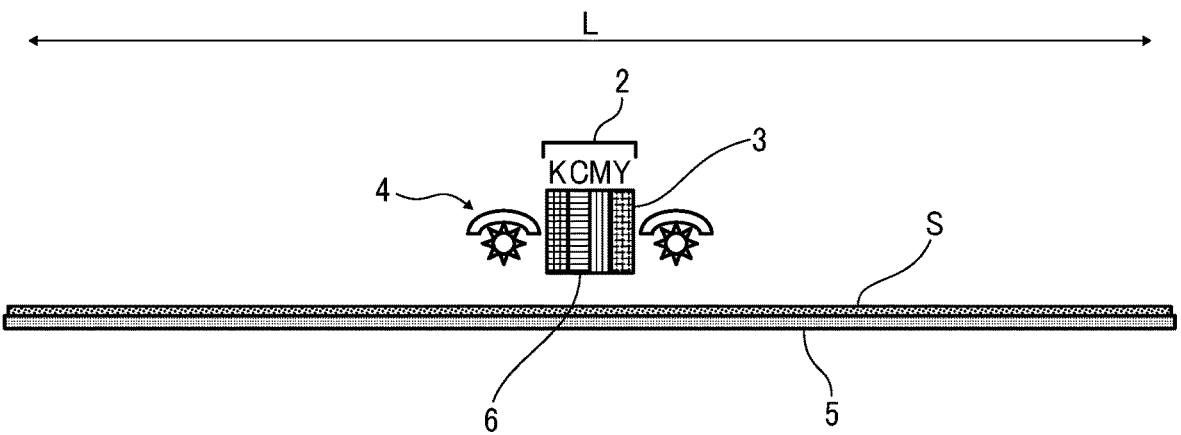
FIG. 3 is a diagram illustrating an enlarged view of the printing device according to an embodiment of the present disclosure.

FIG. 1 is a schematic diagram illustrating a front view of an example of an inkjet printing device as the printing device of the present disclosure. FIG. 2 is a schematic diagram illustrating a side view of an example of an inkjet printing device as the printing device of the present disclosure. FIG. 3 is a schematic diagram illustrating the structure of a part of the inkjet printing device remodeled on a basis of RICOH Pro L4130 (manufactured by Ricoh Co., Ltd.).

An inkjet printing device 1 illustrated in FIGS. 1 to 3 includes a head carriage 2, a recording head 3, an ink discharging unit 6, an ultraviolet irradiator 4, and a platen and heater 5. The platen and heater 5 are disposed under a recording medium S in the inkjet printing device 1.

The recording media S is guided by the platen and heater 5 and moved from front to back in FIG. 3 by the operation of a conveyance device.

A head scanning device reciprocates the head carriage 2 along the direction L in FIG. 3 to scan the recording head 3 held by the head carriage 2.

The head carriage 2 is disposed over the recording media S. It accommodates multiple recording heads 3, which are described later, with the discharging orifice downward in accordance with the number of colors for use in forming images on the recording media S.

The head carriage 2 is disposed in the printing device 1. It reciprocates in the L direction in FIG. 3 by the driving of the head scanning device.

The head carriage 2 is illustrated in FIG. 3, accommodating the recording head 3 of yellow (Y), magenta (M), cyan (C), and black (K). The number of colors for the recording head 3 accommodated in the carriage 2 is suitably determined depending on actual operations.

The recording head 3 discharges ink supplied from an ink supplying device from the ink discharging unit 6 to the recording medium S by the operation of multiple discharging devices (application devices) disposed inside the recording head 3.

The ink discharged from the recording head 3 contains an anionic compound, organic solvent, water, and photoacid generator. The photoacid generator produces an acid (cation) upon application of ultraviolet ink, which acts on the anionic compound to agglomerate or become sticky, thereby minimizing beading and color bleeding.

The recording head 3 discharges ink in a form of droplets to a particular region (ink applicable region) onto the recording medium S while the head scanning device drives the recording head 3 from one end of the recording medium S to the other end along the L direction illustrated in FIG. 3.

The recording head 3 scans the recording medium S in this manner repeatedly on a necessity basis. After the recording head 3 discharges the ink onto a single ink applicable region, the conveyance device moves the recording medium S in the direction from the front to the back in FIG. 3 and then the recording head 3 discharges the ink to the next ink applicable region adjacent to the region where the ink is previously applied relative to the back direction in FIG. 3 while the head is scanning device scans.

An image is formed on the recording medium S as a collective form of ink droplets by the repeated operation of ink discharging from the recording head 3 mentioned above in combination with the head scanning device and the conveyance device.

The ultraviolet irradiator 4 includes an ultraviolet lamp that applies stable exposure energy of ultraviolet radiation in a particular wavelength range and a filter that passes through the particular wavelength range.

The ultraviolet lamp includes a mercury lamp, metal halide lamp, electrodeless lamp, excimer laser, ultraviolet laser, cold cathode fluorescent lamp, hot cathode fluorescent lamp, black light, and light emitting diode (LED). Band-like metal halide lamps, cold cathode fluorescent lamps, hot cathode fluorescent lamps, mercury lamp, and black light are preferable.

The amount of ultraviolet irradiation is preferably from 1 to 3,000 mJ and more preferably from 500 to 2,000 mJ.

Figure 4:
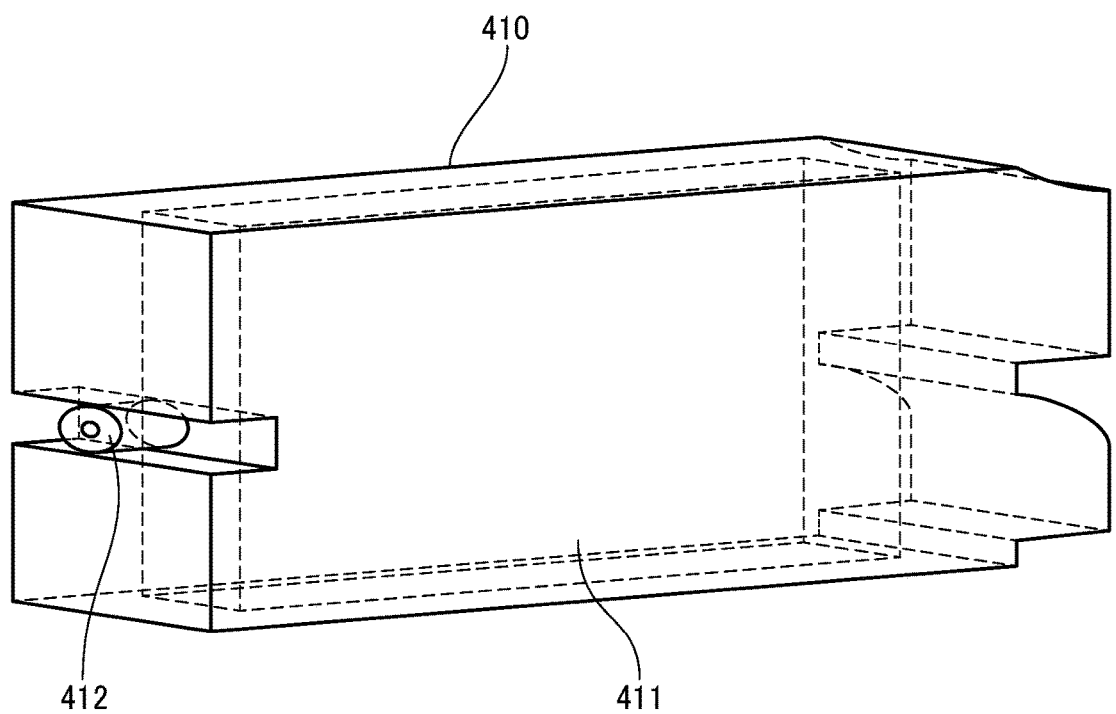
FIG. 4 is a schematic diagram illustrating a perspective view of an example of ink container.

It is preferable to dispose a filter on the flow passage between an ink container (ink cartridge) 410 illustrated in FIG. 4 and the recording head 3 mounted onto the inkjet printing device 1 illustrated in FIG. 3. A filter can be deposited on an ink supply and ejection unit 412. The filter preferably holds particles having a diameter of 10 µm or greater to remove particles having a diameter of 10 µm or greater; a printing device with the filter can have excellent discharging stability.

The filter is preferably made of stainless steel in terms of corrosion resistance because the filter is constantly in contact with the ink. Above all, austenitic stainless steel, particularly SUS304, SUS316, or SUS316L, are particularly preferable, which have excellent corrosion resistance. The filter mentioned above is preferably selected from SUS304, SUS316 and SUS316L.

Filters with different filtering accuracy are procurable. For example, an Acro/Last Chance filter, manufactured by NIHON PALL LTD., can be used. A filter having a filtering accuracy of 10 µm or less can remove the solid content present in ink, thereby enhancing the discharging stability of the ink, which is preferable. It is preferable to use a filter having a filtering accuracy of from 6 to 10 µm because the ink is suitably supplied to a discharging device.

One specific example is 10 μm disposable filter (PALL ACRO25 LCF-12100, filtering accuracy: 10 μm and material: polypropylene).

Terms such as image forming, recording, printing, and print used in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1

Preparation of Surface Reformed Black Pigment Dispersion

A total of 100 g of Black Pearls® 1000 (carbon black having a BET specific surface area of 343 m$^2$/g and an amount of absorbing dibutylphthalate (DBPA) of 105 ml/100 g, manufactured by Cabot Corporation), 100 milimole of sulfanilic acid, and 1 litter of highly deionized water were mixed by a Silverson Mixer at 6,000 rpm in a room temperature environment.

Thereafter, 100 milimole of nitric acid was added to the thus-obtained slurry. Thirty minutes later, 100 milimole of sodium nitrite dissolved in a 10 mL of highly deionized water was gradually added. Furthermore, the resulting material was heated to 60 degrees C. while being stirred to conduct reaction for one hour to obtain a reformed pigment in which sulfanilic acid was added to carbon black.

Next, pH of the product was adjusted to 9 with tetrabutyl ammonium hydroxide solution (methanol solution) at 10 percent to obtain a reformed pigment dispersion in 30 minutes. Thereafter, subsequent to ultrafiltering by dialysis membrane using the dispersion and highly deionized water followed by ultrasonic dispersion, surface reformed pigment dispersion having a solid portion accounting for 20 percent was obtained.

The surface reforming level of the thus-obtained surface reformed pigment dispersion was 0.75 milimole/g and the 50 percent cumulative volume particle diameter ($D_{50}$) was 120 nm as measured by a particle size distribution measuring instrument (NANOTRAC UPA-EX150, manufactured by NIKKISO CO., LTD.).

Preparation Example 2

Preparation of Surface Reformed Magenta Pigment Dispersion

One kg of SMART Magenta 3122BA (Pigment Red 122 surface treated dispersion, solid portion: 14.5 percent by mass, manufactured by SENSIENT Corporation) was subjected to acid deposition with 0.1 normal HCL aqueous solution.

Next, pH of the product was adjusted to 9 with tetraethyl ammonium hydroxide aqueous solution at 10 percent to obtain a reformed pigment dispersion in 30 minutes. The thus-obtained reformed pigment dispersion including a pigment bonded to at least one amino benzoate group or amino benzoate tetraethyl ammonium salt was subjected to ultrafiltering by dialysis membrane with highly deionized water, followed by ultrasonic dispersion to obtain a surface reformed magenta pigment dispersion having a pigment solid portion of 20 percent by mass.

The surface reformed magenta pigment dispersion had a 50 percent cumulative volume particle diameter ($D_{50}$) of 104 nm as measured by a particle size distribution measuring instrument (NANOTRAC UPA-EX150, manufactured by NIKKISO CO., LTD.).

Preparation Example 3

Preparation of Surface Reformed Cyan Pigment Dispersion

One kg of SMART Cyan 3154BA (Pigment Blue 15:4 surface reformed dispersion, solid portion: 14.5 percent, manufactured by SENSIENT Corporation) was subjected to acid deposition with 0.1 normal HCL aqueous solution.

Next, pH of the product was adjusted to 9 with benzyl trimethyl ammonium hydroxide solution (methanol solution) at 40 percent by mass to obtain a reformed pigment dispersion in 30 minutes. The thus-obtained reformed pigment dispersion including a pigment bonded to at least one amino benzoate group or amino benzoate benzyltrimethyl ammonium salt was subjected to ultrafiltering by dialysis membrane with highly deionized water, followed by ultrasonic dispersion to obtain a surface reformed cyan pigment dispersion having a pigment solid portion of 20 percent by mass.

The surface reformed cyan pigment dispersion had a 50 percent cumulative volume particle diameter ($D_{50}$) of 116 nm as measured by a particle size distribution measuring instrument (NANOTRAC UPA-EX150, manufactured by NIKKISO CO., LTD.).

Preparation Example 4

Preparation of Surface Reformed Yellow Pigment Dispersion

Next, pH of 1 kg of SMART Yellow 3074BA (Pigment Yellow 74 surface treated dispersion, solid portion: 14.5 percent, manufactured by SENSIENT Corporation) was adjusted to 9 with tetrabutyl ammonium hydroxide solution (methanol solution) at 10 percent by mass to obtain a reformed pigment dispersion in 30 minutes. The thus-obtained reformed pigment dispersion including a pigment bonded to at least one amino benzoate group or amino benzoate tetrabutyl ammonium salt was subjected to ultrafiltering by dialysis membrane with highly deionized water, followed by ultrasonic dispersion to obtain a surface reformed yellow pigment dispersion having a pigment solid portion of 20 percent by mass.

The surface reformed yellow pigment dispersion had a 50 percent cumulative volume particle diameter ($D_{50}$) of 145 nm as measured by a particle size distribution measuring instrument (NANOTRAC UPA-EX150, manufactured by NIKKISO CO., LTD.).

Preparation Example 5

Preparation of Polymer Solution A

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed in the flask and heated to 65 degrees C. Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobismethyl valeronitrile, and 18 g of methylethyl ketone was dripped into the flask in two and a half hours. Subsequently, a liquid mixture of 0.8 g of azobismethyl valeronitrile and 18 g of methyl ethyl ketone was added dropwise to the flask in half an hour.

After one-hour aging at 65 degrees C., 0.8 g of azobismethyl valeronitrile was added followed by aging for another hour. After the reaction was complete, 364 g of methylethyl ketone was added to the flask to obtain 800 g of a polymer solution A having a concentration of 50 percent.

Preparation of Liquid Dispersion of Polymer Particulate Containing Magenta Pigment After 28 g of the polymer solution A, 42 g of C.I. Pigment Red 122, 13.6 g of 1 mol/L potassium hydroxide solution, 20 g of methylethyl ketone, and 13.6 g of deionized water were sufficiently stirred, the mixture was mixed and kneaded using a roll mill. The obtained paste was placed in 200 g of pure water followed by sufficient stirring. Methylethyl ketone and water were distilled away using an evaporator. Furthermore, this liquid dispersion was filtered under pressure by a polyvinylidene fluoride membrane filter having an average hole diameter of 5.0 μm to remove coarse particles. Consequently, a liquid dispersion of polymer particulates containing a magenta pigment was obtained, which contained the pigment in an amount of 15 percent by mass and a solid content of 20 percent by mass.

The liquid dispersion of polymer particulates containing a magenta pigment had a 50 percent cumulative volume particle diameter ($D_{50}$) of 127 nm as measured by a particle size distribution measuring instrument (NANOTRAC UPA-EX150, manufactured by NIKKISO CO., LTD.).

Preparation Example 6

Preparation of Liquid Dispersion of Polymer Particulate Containing Cyan Pigment

Liquid dispersion of polymer particulate containing a cyan pigment was prepared in the same manner as in Preparation Example 5 except that C.I. Pigment red 122 serving as pigment was changed to a phthalocyanine pigment (C.I. Pigment Blue 15:3).

The cumulative average particle diameter ($D_{50}$) of the polymer particulates in the liquid dispersion of polymer particulates containing a cyan pigment was 93 nm as measured by particle size distribution measuring instrument (NANOTRAC UPA-EX150, manufactured by NIKKISO CO., LTD.).

Preparation Example 7

Preparation of Liquid Dispersion of Polymer Particulate Containing Yellow Pigment A liquid dispersion of polymer particulates containing a yellow pigment was prepared in the same manner as in Preparation Example 5 except that C.I. Pigment Red 122 was replaced with bisazo yellow pigment (C.I. Pigment Yellow 155).

The liquid dispersion of polymer particulates containing a yellow pigment had a 50 percent cumulative volume particle diameter ($D_{50}$) of 76 nm as measured by a particle size distribution measuring instrument (NANOTRAC UPA-EX150, manufactured by NIKKISO CO., LTD.).

Preparation Example 8

Preparation of Liquid Dispersion of Polymer Particulate Containing Carbon Black Pigment A liquid dispersion of polymer particulates containing a black pigment was prepared in the same manner as in Preparation Example 5 except that C.I. Pigment Red 122 serving as pigment was changed to carbon black (FW100, manufactured by Degussa AG).

The cumulative average particle diameter ($D_{50}$) of the polymer particulates in the liquid dispersion of polymer particulates containing a black pigment was 104 nm as measured by particle size distribution measuring instrument (NANOTRAC UPA-EX150, manufactured by NIKKISO CO., LTD.).

Preparation Example 1 of Resin Particle

Preparation of Water-Dispersible Polyurethane Resin A
Preparation of Polyester Polyol P-1

A total of 830 parts of terephthalic acid, 830 parts of isophthalic acid, 374 parts of ethylene glycol, 598 parts of neopentyl glycol, and 0.5 parts of dibutyltin oxide were loaded in a reaction container equipped with a thermometer, a nitrogen gas introducing tube, and a stirrer and allowed to conduct polycondensation reaction at 230 degrees C. for 15 hours while introducing nitrogen gas into the reaction container until the acid value was 1 or less at 180 to 230 degrees C. to obtain a polyester polyol P-1 having a hydroxyl value of 74.5 mgKOH/g, an acid value of 0.2 mgKOH/g, and an average molecular weight of 1500.

Preparation of Hydrophobic Polyester Polyol Q-1

A total of 1,660 parts of orthophthalic acid, 1,637 parts of diethylene glycol, and 0.5 parts of dibutyltin oxide were charged in a container equipped with a thermometer, a nitrogen gas introducing tube, and a stirrer and allowed to conduct polycondensation reaction at 230 degrees C. for 15 hours while introducing nitrogen gas into the reaction container until the acid value was 1 or less at 180 to 230 degrees C. to obtain a polyester polyol Q-1 having an aromatic ring structure with a hydroxyl value of 190 mgKOH/g and an acid value of 0.3 mgKOH/g.

Preparation of Water-Dispersible Polyurethane Resin A

A thousand parts of polyester polyol P-1 was subjected to dehydration at 100 degrees with a reduced pressure. Subsequent to cooling down to 80 degrees C., 907 parts of methylethyl ketone was added followed by sufficient stirring to obtain a solution. Thereafter, 80 parts of 2,2'-dimethylol propionic acid was added to the solution.

Next, 281 parts of isophorone diisocyanate was added to allow reaction at 75 degrees C. for eight hours to complete urethanation. After the isocyanate value became 0.1 percent or less, the mixture was cooled down to 50 degrees C. and 340 parts of the polyester polyol Q-1 was added to obtain a homogeneous solution. After 60 parts of triethyl amine was added for neutralization, 7000 parts of water was added to obtain an aqueous solution.

After removing methyl ethyl ketone from the obtained transparent reaction product under a reduced pressure at a temperature range of from 40 to 60 degrees C., water was added to adjust the concentration to obtain a stable translucent colloidal water dispersion having a nonvolatile content of 25 percent.

Preparation Example 2 of Resin Particle

Preparation of Water-Dispersible Polyurethane Resin B

A thousand parts of polyester polyol P-1 was subjected to dehydration at 100 degrees with a reduced pressure. Subsequent to cooling down to 80 degrees C., 907 parts of methylethyl ketone was added followed by sufficient stirring to obtain a solution. Thereafter, 80 parts of 2,2'-dimethylol propionic acid was added to the solution.

Next, 281 parts of isophorone diisocyanate was added to allow reaction at 75 degrees C. for eight hours to complete urethanation. After the isocyanate value became 0.1 percent or less, the mixture was cooled down to 50 degrees C. After 60 parts of triethyl amine was added for neutralization, 7,000 parts of water was added to obtain an aqueous solution. After removing methyl ethyl ketone from the obtained transparent reaction product under a reduced pressure at a temperature range of from 40 to 60 degrees C., water was added to adjust the concentration to obtain a stable translucent colloidal aqueous dispersion having a nonvolatile content of 25 percent by mass.

Preparation Example 3 of Resin Particle

Preparation of Water-dispersible Polyurethane Resin C
Preparation of Polyester Polyol P-2

A total of 664 parts of terephthalic acid, 631 parts of isophthalic acid, 472 parts of 1,4-butanediol, 447 parts of neopentyl glycol, and 0.5 parts of dibutyltin oxide were loaded in a reaction container equipped with a thermometer, a nitrogen gas introducing tube, and a stirrer and allowed to react at 180 to 230 degrees C. for five hours for esterification while introducing nitrogen gas into the reaction container followed by polycondensation reaction at 230 degrees C. for six hours until the acid value was 1 mgKOH/g or less.

Thereafter, the resulting solution was cooled down to 120 degrees C. A total of 321 parts of adipic acid and 268 parts of 2,2'-dimethylol propionic acid were added thereto followed by heating again to 170 degrees C. to allow reaction at this temperature for 20 hours to obtain a polyester polyol P-2 having a carboxyl group having an acid value of 46.5 mgKOH/g and a hydroxyl value of 59.8 mgKOH/g.

Preparation of Water-Dispersible Polyurethane Resin C

A thousand parts of polyester polyol P-2 was subjected to dehydration at 100 degrees with a reduced pressure. Subsequent to cooling down to 80 degrees C., 812 parts of methylethyl ketone was added followed by sufficient stirring to obtain a solution. Thereafter, 20 parts of 1,4'-butane diol was added to the solution.

Next, 198 parts of dicyclohexyl methane-4,4'-diisocyanate (hydrogenated MDI) was added to allow reaction for eight hours. After the isocyanate value became 0.1 percent or less, the mixture was cooled down to 50 degrees C. After 84 parts of triethyl amine was added for neutralization, 7,000 parts of water was added to obtain an aqueous solution.

After removing methyl ethyl ketone from the obtained transparent reaction product under a reduced pressure at a temperature range of from 40 to 60 degrees C., water was added to adjust the concentration to obtain a stable translucent colloidal aqueous dispersion having a nonvolatile content of 25 percent by mass.

Preparation Example 4 of Resin Particle

Preparation of Water-Dispersible Polyurethane Resin D

A thousand parts of polyester polyol P-1 was subjected to dehydration at 100 degrees with a reduced pressure. Subsequent to cooling down to 80 degrees C., 907 parts of methylethyl ketone was added followed by sufficient stirring to obtain a solution. Thereafter, 80 parts of 2,2'-dimethylol propionic acid was added to the solution.

Next, 281 parts of isophorone diisocyanate was added to allow reaction at 75 degrees C. for eight hours to complete urethanation. After the isocyanate value became 0.1 percent by mass or less, the mixture was cooled down to 50 degrees C. After 60 parts of triethyl amine was added for neutralization, 7,000 parts of water was added to obtain an aqueous solution. After removing methyl ethyl ketone from the obtained transparent reaction product under a reduced pressure at a temperature range of from 40 to 60 degrees C., water was added to adjust the concentration to obtain a stable translucent colloidal water dispersion having a nonvolatile content of 25 percent by mass.

Preparation Example 5 of Resin Particle

Preparation of Acrylic-Silicone Polymer Particulate A

After sufficient replacement with nitrogen gas in a flask (1 L) equipped with a mechanical stirrer, a thermometer, a nitrogen gas introducing tube, a reflux tube, and a dripping funnel, 8.0 g of LATEMUL S-180 (reactive anionic surfactant, manufactured by Kao Corporation) was admixed with 350 g of deionized water and heated to 65 degrees C.

Thereafter, 3.0 g of t-butylperoxy benzoate serving as reaction initiator and 1.0 g of sodium isoascorbiate were added to the mixture. Five minutes later, a mixture of 45 g of methylmethacrylate, 160 g of methacrylic acid-2-ethylhexyl, 5 g of acrylic acid, 45 g of butylmethacrylate, 30 g of cyclohexyl methacrylate, 15 g of vinyltriethoxysilane, 8.0 g of LATEMUL S-180, and 340 g of deionized water were dripped in the flask in three hours.

Subsequent to heating at 80 degrees C. for two-hour aging, the resulting aged matter was cooled down to room temperature. pH of the resulting matter was adjusted to 7 to 8 by sodium hydroxide.

Thereafter, ethanol was distilled away by an evaporator followed by moisture adjustment to obtain 730 g of acrylic-silicone polymer particulate having a solid portion of 40 percent by mass. In addition, the 50 percent cumulative volume particle diameter ($D_{50}$) of the polymer particulate in the dispersion was 125 nm as measured by a particle size distribution measuring instrument (NANOTRAC UPA-EX150, manufactured by NIKKISO CO., LTD.).

Example 1

Preparation of Ink

A total of 65.00 parts of 3-methoxy-N,N-dimethyl propane amide, 2.00 parts of 2-ethyl-1,3-hexane diol, 5.00 parts of propylene glycol, 0.40 parts of 2,5,8,11-tetramethyl decane-5,8-diol, 1.00 part of polyether-modified siloxane compound represented by Chemical Formula 8 illustrated above, and 1.00 part of photoacid generator represented by Chemical Formula 1 illustrated above were mixed and stirred in a vessel equipped with a stirrer for 30 minutes.

Next, 0.10 parts of polyoxyethylene perfluoroalkyl ether (UNIDYNE™ DSN403N, effective component of 100 percent, manufactured by DAIKIN INDUSTRIES, LTD.), 0.05 parts of preservatives and fungicides (Proxel GXL, manufactured by Avecia Inkjet Limited), 0.30 parts of 2-amino-2-ethyl-1,3-propane diol, 20.00 parts of the liquid dispersion of polymer particulate containing carbon black pigment of Preparation Example 8, and a balance of pure water to make the total 100 percent were added followed by mixing and stirring for 60 minutes.

Thereafter, the thus-obtained mixture was filtered with a polyvinilydene fluoride membrane filter having an average hole diameter of 1.2 μm under pressure to remove coarse particles and dust. Thus, ink of Example 1 was obtained.

Example 2

Preparation of Ink

A total of 7.50 parts of 3-methoxy-N,N-dimethyl propane amide, 5.00 parts of propylene glycol monopropyl ether, 22.00 parts of propylene glycol, 2.00 parts of 2-ethyl-1,3-hexane diol, 0.50 parts of 2,4,7,9-tetramethyl decane-4,7-diol, 1.50 parts of polyether-modified siloxane compound represented by Chemical Formula 8 illustrated above, and 1.50 parts of photoacid generator represented by Chemical Formula 2 illustrated above were mixed and stirred in a vessel equipped with a stirrer for 30 minutes.

Thereafter, 0.05 parts of preservatives and fungicides (Proxel GXL, manufactured by Avecia Inkjet Limited), 0.30 parts of 2-amino-2-ethyl-1,3-propane diol, 24.00 parts of the prepared water-dispersible polyurethane resin A, 1.62 parts of polyurethane dispersion (TAKELAC™ W-6110, manufactured by Mitsui Chemicals, Inc.), 15.00 parts of surface-modified black pigment dispersion of Preparation Example 1, and a balance of pure water to make the total 100 parts were added to the mixture followed by mixing and stirring for 60 minutes.

Thereafter, the thus-obtained mixture was filtered with a polyvinilydene fluoride membrane filter having an average hole diameter of 1.2 μm with a reduced pressure to remove coarse particles and dust. The ink of Example 2 was thus obtained.

Examples 3 to 22 and Comparative Examples 1 to 5

Preparation of Ink

The organic solvents, the surfactants, defoaming agents, and photoacid generators shown in each column of Examples 3 to 22 and Comparative Examples 1 to 5 were mixed and stirred in the same manner as in Examples 1 and 2. Thereafter, the mildew-proofing agent, pH regulator, and coloring material (pigment dispersion) were mixed and stirred. Moreover, the water-dispersible polyurethane resin and resin particles were mixed and stirred. Thereafter, the thus-obtained mixture was filtered with a polyvinilydene fluoride membrane filter having an average opening diameter of 1.2 μm with an increased pressure to remove coarse particles and dust. The inks of Examples 3 to 22 and Comparative Examples 1 to 5 were thus prepared.

TABLE 1

| Component (percent by mass) | | Example 1 | Example 2 | Example 3 | Example 4 |
|---|---|---|---|---|---|
| Coloring material (pigment dispersion) | Surface reformed black pigment dispersion (Preparation Example 1) | — | 15.00 | — | — |
| | Surface reformed magenta pigment dispersion (Preparation Example 2) | — | — | 12.50 | — |
| | Surface reformed yellow pigment dispersion (Preparation Example 3) | — | — | — | 10.00 |
| | Surface reformed yellow pigment dispersion (Preparation Example 4) | — | — | — | — |
| | Liquid dispersion of polymer particulate containing magenta pigment (Preparation Example 5) | — | — | — | — |
| | Liquid dispersion of polymer particulate containing cyan pigment (Preparation Example 6) | — | — | — | — |
| | Liquid dispersion of polymer particulate containing yellow pigment (Preparation Example 7) | — | — | — | — |
| | Liquid dispersion of polymer particulate containing carbon black pigment (Preparation Example 8) | 20.00 | — | — | — |

TABLE 1-continued

| | | | | | | |
|---|---|---|---|---|---|---|
| Resin particle | Resin including Chemical Formula A | Water-dispersible polyurethane resin A (Preparation Example 1) | — | 24.00 | — | — |
| | | Water-dispersible polyurethane resin B (Preparation Example 2) | — | — | 30.00 | — |
| | | Water-dispersible polyurethane resin C (Preparation Example 3) | — | — | — | 40.00 |
| | | Water-dispersible polyurethane resin D (Preparation Example 4) | — | — | — | — |
| | Other Resins | Polyurethane dispersion "SUPERFLEX® 300" | — | — | 1.67 | 1.00 |
| | | Polyurethane dispersion "TAKELAC™ W-6110" | — | 1.62 | — | — |
| | | Acrylic-silicone polymer particulate A (Preparation Example 5) | — | — | — | — |
| Organic solvent | Organic solvent 1 | 3-methoxy-N,N-dimethyl propionamide (SP value: 9.19) | 65.00 | 7.50 | 5.00 | 5.00 |
| | | 3-n-butoxy-N,N-dimethyl propanamide (SP value: 9.03) | — | — | 3.00 | — |
| | | 3-ethyl-3-hydroxylmethyl oxetane (SP value: 11.31) | — | — | 2.00 | — |
| | | 3-methyl-3-hydroxylmethyl oxetane (SP value: 11.79) | — | — | — | 3.00 |
| | | Propylene glycol mono-propyl ether (SP value: 9.82) | — | 5.00 | — | — |
| | | Propylene glycol mono-butyl ether (SP value: 9.69) | — | — | 2.00 | — |
| | | 3-methoxy-1-butanol (SP value: 9.98) | — | — | — | — |
| | | 3-methoxy-3-methyl-1-butanol (SP value: 9.64) | — | — | — | — |
| | | 2-ethyl-1,3-hexanediol (SP value: 10.6) | 2.00 | 2.00 | 2.00 | 2.00 |
| | | 2,2,4-trimethyl-1,3-pentanediol (SP value: 10.8) | — | — | — | — |
| | Organic solvent 2 | Glycerin (SP value: 16.38) | — | — | 5.00 | — |
| | | 3-methyl-1,3-butane diol (SP value: 12.05) | — | — | — | — |
| | | Propylene glycol (SP value: 13.72) | 5.00 | 22.00 | 15.00 | 22.00 |
| Surfactant | | Chemical Formula 8 polyether-modified siloxane compound | 1.00 | 1.50 | — | — |
| | | Chemical Formula 10 polyether-modified siloxane compound | — | — | 1.00 | 2.00 |
| | | Chemical Formula 11 polyether-modified siloxane compound | — | — | — | — |
| | | TEGO Wet 270 | — | — | — | — |
| | | SILFACE SAG503A | — | — | — | — |
| | | Surfynol 104E (effective component: 50 percent) | — | — | — | — |
| | | Surfynol 420 (effective component: 100 percent) | — | — | — | — |
| | | Olfin EXP.4300 (effective component: 60 percent) | — | — | — | — |
| | | UNIDYNE™ DSN403N | 0.10 | — | — | — |
| Photoacid generator | | Chemical Formula 1 | 1.00 | — | — | — |
| | | Chemical Formula 2 | — | 1.50 | — | — |
| | | Chemical Formula 5 | — | — | 2.00 | — |
| | | Chemical Formula 7 | — | — | — | 3.00 |

TABLE 1-continued

|  |  |  |  |  |  |
|---|---|---|---|---|---|
|  | Chemical Formula 8 | — | — | — | — |
|  | Chemical Formula 9 | — | — | — | — |
|  | Chemical Formula 12 | — | — | — | — |
| Mildew-proofing agent | Proxel GXL | 0.05 | 0.05 | 0.05 | 0.05 |
| Foam inhibitor (defoaming agent) | 2,4,7,9-tetramethyldecane-4,7-diol | — | 0.50 | 0.50 | 0.50 |
|  | 2,5,8,11-tetramethyldodecane-5,8-diol | 0.40 | — | — | — |
| pH regulator | 2-amino-2-ethyl-1,3-propane diol | 0.30 | 0.30 | 0.20 | 0.30 |
| Water | Pure water | Balance | Balance | Balance | Balance |
| Total (percent by mass) |  | 100 | 100 | 100 | 100 |

|  |  |  | Example |  |  |
|---|---|---|---|---|---|
| Component (percent by mass) |  |  | 5 | 6 | 7 |
| Coloring material (pigment dispersion) |  | Surface reformed black pigment dispersion (Preparation Example 1) | — | — | — |
|  |  | Surface reformed magenta pigment dispersion (Preparation Example 2) | — | — | — |
|  |  | Surface reformed yellow pigment dispersion (Preparation Example 3) | — | — | — |
|  |  | Surface reformed yellow pigment dispersion (Preparation Example 4) | 12.50 | — | — |
|  |  | Liquid dispersion of polymer particulate containing magenta pigment (Preparation Example 5) | — | 20.00 | — |
|  |  | Liquid dispersion of polymer particulate containing cyan pigment (Preparation Example 6) | — | — | 16.67 |
|  |  | Liquid dispersion of polymer particulate containing yellow pigment (Preparation Example 7) | — | — | — |
|  |  | Liquid dispersion of polymer particulate containing carbon black pigment (Preparation Example 8) | — | — | — |
| Resin particle | Resin including Chemical Formula A | Water-dispersible polyurethane resin A (Preparation Example 1) | — | 32.00 | — |
|  |  | Water-dispersible polyurethane resin B (Preparation Example 2) | — | — | 24.00 |
|  |  | Water-dispersible polyurethane resin C (Preparation Example 3) | — | — | — |
|  |  | Water-dispersible polyurethane resin D (Preparation Example 4) | 30.00 | — | — |
|  | Other Resins | Polyurethane dispersion "SUPERFLEX® 300" | 3.23 | — | — |
|  |  | Polyurethane dispersion "TAKELAC™ W-6110" | — | 1.62 | 1.62 |
|  |  | Acrylic-silicone polymer particulate A (Preparation Example 5) | — | — | 3.75 |
| Organic solvent | Organic solvent 1 | 3-methoxy-N,N-dimethyl propionamide (SP value: 9.19) | 5.00 | — | 10.00 |
|  |  | 3-n-butoxy-N,N-dimethyl propanamide (SP value: 9.03) | — | 3.00 | — |

TABLE 1-continued

|  |  |  |  |  |
|---|---|---|---|---|
|  | 3-ethyl-3-hydroxyl methyl oxetane (SP value: 11.31) | — | 5.00 | — |
|  | 3-methyl-3-hydroxylmethyl oxetane (SP value: 11.79) | 3.00 | — | — |
|  | Propylene glycol mono-propyl ether (SP value: 9.82) | — | — | — |
|  | Propylene glycol mono-butyl ether (SP value: 9.69) | — | — | — |
|  | 3-methoxy-1-butanol (SP value: 9.98) | — | 3.00 | — |
|  | 3-methoxy-3-methyl-1-butanol (SP value: 9.64) | — | — | 4.00 |
|  | 2-ethyl-1,3-hexanediol (SP value: 10.6) | — | — | 2.00 |
|  | 2,2,4-trimethyl-1,3-pentanediol (SP value: 10.8) | 2.00 | 2.00 | — |
| Organic solvent 2 | Glycerin (SP value: 16.38) | 3.00 | — | — |
|  | 3-methyl-1,3-butane diol (SP value: 12.05) | 5.00 | — | — |
|  | Propylene glycol (SP value: 13.72) | 20.00 | 20.00 | 20.00 |
| Surfactant | Chemical Formula 8 polyether-modified siloxane compound | — | — | — |
|  | Chemical Formula 10 polyether-modified siloxane compound | — | — | — |
|  | Chemical Formula 11 polyether-modified siloxane compound | 2.00 | — | — |
|  | TEGO Wet 270 | — | 1.00 | — |
|  | SILFACE SAG503A | — | — | 2.00 |
|  | Surfynol 104E (effective component: 50 percent) | — | — | — |
|  | Surfynol 420 (effective component: 100 percent) | — | — | — |
|  | Olfin EXP.4300 (effective component: 60 percent) | — | — | — |
|  | UNIDYNE™ DSN403N | — | — | — |
| Photoacid generator | Chemical Formula 1 | — | — | — |
|  | Chemical Formula 2 | — | — | — |
|  | Chemical Formula 5 | — | — | — |
|  | Chemical Formula 7 | — | — | — |
|  | Chemical Formula 8 | 0.50 | — | 2.50 |
|  | Chemical Formula 9 | — | 2.50 | — |
|  | Chemical Formula 12 | — | — | — |
| Mildew-proofing agent | Proxel GXL | 0.05 | 0.05 | 0.05 |
| Foam inhibitor (defoaming agent) | 2,4,7,9-tetramethyldecane-4,7-diol | — | — | 0.40 |
|  | 2,5,8,11-tetramethyldodecane-5,8-diol | 0.40 | 0.40 | — |
| pH regulator | 2-amino-2-ethyl-1,3-propane diol | 0.40 | 0.20 | 0.20 |
| Water | Pure water | Balance | Balance | Balance |
| Total (percent by mass) |  | 100 | 100 | 100 |

TABLE 2

| | Component (percent by mass) | | Example 8 | Example 9 | Example 10 |
|---|---|---|---|---|---|
| Coloring material (pigment dispersion) | | Surface reformed black pigment dispersion (Preparation Example 1) | — | — | — |
| | | Surface reformed magenta pigment dispersion (Preparation Example 2) | — | — | — |
| | | Surface reformed cyan pigment dispersion (Preparation Example 3) | — | — | — |
| | | Surface reformed yellow pigment dispersion (Preparation Example 4) | — | — | — |
| | | Liquid dispersion of polymer particulate containing magenta pigment (Preparation Example 5) | — | — | — |
| | | Liquid dispersion of polymer particulate containing cyan pigment (Preparation Example 6) | — | — | — |
| | | Liquid dispersion of polymer particulate containing yellow pigment (Preparation Example 7) | 16.67 | — | — |
| | | Liquid dispersion of polymer particulate containing carbon black pigment (Preparation Example 8) | — | 20.00 | 20.00 |
| Resin particle | Resin including Chemical Formula A | Water-dispersible polyurethane resin A (Preparation Example 1) | — | — | 11.20 |
| | | Water-dispersible polyurethane resin B (Preparation Example 2) | — | — | — |
| | | Water-dispersible polyurethane resin C (Preparation Example 3) | 34.00 | — | — |
| | | Water-dispersible polyurethane resin D (Preparation Example 4) | — | 26.00 | — |
| | Other resins | Polyurethane dispersion "SUPERFLEX ® 300" | 1.67 | — | 16.67 |
| | | Polyurethane dispersion "TAKELAC ™ W-6110" | — | 1.62 | — |
| | | Acrylic-silicone polymer particulate A (Preparation Example 5) | — | 2.40 | — |
| Organic solvent | Organic solvent 1 | 3-methoxy-N,N-dimethyl propanamide (SP value: 9.19) | 8.00 | 7.50 | 5.00 |
| | | 3-n-butoxy-N,N-dimethyl propanamide (SP value: 9.03) | — | — | — |
| | | 3-ethyl-3-hydroxyl methyl oxetane (SP value: 11.31) | 1.00 | 2.50 | 3.00 |
| | | 3-methyl-3-hydroxylmethyl oxetane (SP value: 11.79) | — | — | — |
| | | Propylene glycol mono-propyl ether (SP value: 9.82) | — | 3.00 | — |
| | | Propylene glycol mono-butyl ether (SP value: 9.69) | — | — | 3.00 |
| | | 3-methoxy-1-butanol (SP value: 9.98) | 6.00 | — | — |
| | | 3-methoxy-3-methyl-1-butanol (SP value: 9.64) | — | — | 2.00 |
| | | 2-ethyl-1,3-hexanediol (SP value: 10.6) | 1.00 | 2.00 | 2.00 |

TABLE 2-continued

| | Component (percent by mass) | | | |
|---|---|---|---|---|
| Organic solvent 2 | 2,2,4-trimethyl-1,3-pentanediol (SP value: 10.8) | — | — | — |
| | Glycerin (SP value: 16.38) | — | — | — |
| | 3-methyl-1,3-butane diol (SP value: 12.05) | — | — | 5.00 |
| | Propylene glycol (SP value: 13.72) | 18.00 | 20.00 | 15.00 |
| Surfactant | Chemical Formula 8 polyether-modified siloxane compound | — | — | — |
| | Chemical Formula 10 polyether-modified siloxane compound | — | — | — |
| | Chemical Formula 11 polyether-modified siloxane compound | — | — | — |
| | TEGO Wet 270 | 0.50 | 0.50 | 0.50 |
| | SILFACE SAG503A | 1.00 | 1.00 | — |
| | Surfynol 104E (effective component: 50 percent) | — | — | 2.00 |
| | Surfynol 420 (effective component: 100 percent) | — | — | — |
| | Olfin EXP.4300 (effective component: 60 percent) | — | — | — |
| | UNIDYNE™ DSN403N | — | — | — |
| Photoacid generator | Chemical Formula 1 | — | — | 2.00 |
| | Chemical Formula 2 | — | — | — |
| | Chemical Formula 5 | — | — | — |
| | Chemical Formula 7 | 1.00 | — | — |
| | Chemical Formula 8 | — | — | — |
| | Chemical Formula 9 | — | — | — |
| | Chemical Formula 12 | — | 2.00 | — |
| Mildew-proofing agent | Proxel GXL | 0.05 | 0.05 | 0.05 |
| Foam Inhibitor (Defoaming Agent) | 2,4,7,9-tetramethyldecane-4,7-diol | 0.40 | 0.40 | 0.40 |
| | 2,5,8,11-tetramethyldodecane-5,8-diol | — | — | — |
| pH regulator | 2-amino-2-ethyl-1,3-propane diol | 0.30 | 0.20 | 0.30 |
| Water | Pure water | Balance | Balance | Balance |
| Total (percent by mass) | | 100 | 100 | 100 |

| | | Example | | | |
|---|---|---|---|---|---|
| | Component (percent by mass) | 11 | 12 | 13 | 14 |
| Coloring material (pigment dispersion) | Surface reformed black pigment dispersion (Preparation Example 1) | — | — | — | — |
| | Surface reformed magenta pigment dispersion (Preparation Example 2) | — | — | — | — |
| | Surface reformed cyan pigment dispersion (Preparation Example 3) | — | — | — | — |
| | Surface reformed yellow pigment dispersion (Preparation Example 4) | — | — | — | — |
| | Liquid dispersion of polymer particulate containing magenta pigment (Preparation Example 5) | 20.00 | — | — | — |
| | Liquid dispersion of polymer particulate containing cyan pigment (Preparation Example 6) | — | 6.67 | — | — |

TABLE 2-continued

|  |  |  |  |  |  |  |
|---|---|---|---|---|---|---|
|  |  | Liquid dispersion of polymer particulate containing yellow pigment (Preparation Example 7) | — | — | 7.33 | — |
|  |  | Liquid dispersion of polymer particulate containing carbon black pigment (Preparation Example 8) | — | — | — | 20.00 |
| Resin particle | Resin including Chemical Formula A | Water-dispersible polyurethane resin A (Preparation Example 1) | 20.00 | — | — | — |
|  |  | Water-dispersible polyurethane resin B (Preparation Example 2) | — | 40.00 | — | — |
|  |  | Water-dispersible polyurethane resin C (Preparation Example 3) | — | — | 45.71 | — |
|  |  | Water-dispersible polyurethane resin D (Preparation Example 4) | — | — | — | 26.00 |
|  | Other resins | Polyurethane dispersion "SUPERFLEX ® 300" | 1.67 | — | — | — |
|  |  | Polyurethane dispersion "TAKELAC ™ W-6110" | — | 1.62 | 1.62 | 1.62 |
|  |  | Acrylic-silicone polymer particulate A (Preparation Example 5) | — | — | — | 2.40 |
| Organic solvent | Organic solvent 1 | 3-methoxy-N,N-dimethyl propanamide (SP value: 9.19) | 5.00 | 5.00 | 20.00 | 7.50 |
|  |  | 3-n-butoxy-N,N-dimethyl propanamide (SP value: 9.03) | — | — | — | — |
|  |  | 3-ethyl-3-hydroxylmethyl oxetane (SP value: 11.31) | 3.00 | 3.00 | 3.00 | 2.50 |
|  |  | 3-methyl-3-hydroxylmethyl oxetane (SP value: 11.79) | — | — | — | — |
|  |  | Propylene glycol mono-propyl ether (SP value: 9.82) | 5.00 | — | 2.00 | 3.00 |
|  |  | Propylene glycol mono-butyl ether (SP value: 9.69) | — | 5.00 | — | — |
|  |  | 3-methoxy-1-butanol (SP value: 9.98) | — | — | — | — |
|  |  | 3-methoxy-3-methyl-1-butanol (SP value: 9.64) | — | — | — | — |
|  |  | 2-ethyl-1,3-hexanediol (SP value: 10.6) | 2.00 | 2.00 | 2.00 | 2.00 |
|  |  | 2,2,4-trimethyl-1,3-pentanediol (SP value: 10.8) | — | — | — | — |
|  | Organic solvent 2 | Glycerin (SP value: 16.38) | 4.00 | — | 2.00 | — |
|  |  | 3-methyl-1,3-butane diol (SP value: 12.05) | 5.00 | 5.00 | 5.00 | — |
|  |  | Propylene glycol (SP value: 13.72) | 15.00 | 13.00 | 5.00 | 20.00 |
| Surfactant |  | Chemical Formula 8 polyether-modified siloxane compound | — | — | — | — |
|  |  | Chemical Formula 10 polyether-modified siloxane compound | — | — | — | — |
|  |  | Chemical Formula 11 polyether-modified siloxane compound | — | — | — | — |
|  |  | TEGO Wet 270 | — | 0.50 | — | 0.50 |
|  |  | SILFACE SAG503A | 1.00 | — | 2.00 | 1.00 |
|  |  | Surfynol 104E (effective component: 50 percent) | — | — | 1.00 | — |

TABLE 2-continued

|  |  |  |  |  |  |
|---|---|---|---|---|---|
|  | Surfynol 420 (effective component: 100 percent) | 2.00 | — | — | — |
|  | Olfin EXP.4300 (effective component: 60 percent) | — | 1.50 | — | — |
|  | UNIDYNE™ DSN403N | — | — | — | — |
| Photoacid generator | Chemical Formula 1 | — | — | — | — |
|  | Chemical Formula 2 | 2.50 | — | — | — |
|  | Chemical Formula 5 | — | 3.00 | — | — |
|  | Chemical Formula 7 | — | — | 1.00 | — |
|  | Chemical Formula 8 | — | — | — | — |
|  | Chemical Formula 9 | — | — | — | — |
|  | Chemical Formula 12 | — | — | — | 0.25 |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.40 | 0.40 | 0.40 | 0.40 |
|  | 2,5,8,11-tetramethyldodecane-5,8-diol | — | — | — | — |
| pH regulator | 2-amino-2-ethyl-1,3-propane diol | 0.30 | 0.30 | 0.30 | 0.20 |
| Water | Pure water | Balance | Balance | Balance | Balance |
| Total (percent by mass) |  | 100 | 100 | 100 | 100 |

TABLE 3

|  | Component (percent by mass) | Example 15 | Example 16 | Example 17 | Example 18 |
|---|---|---|---|---|---|
| Coloring material (pigment dispersion) | Surface reformed black pigment dispersion (Preparation Example 1) | — | — | — | — |
|  | Surface reformed magenta pigment dispersion (Preparation Example 2) | — | — | — | — |
|  | Surface reformed cyan pigment dispersion (Preparation Example 3) | — | — | — | — |
|  | Surface reformed yellow pigment dispersion (Preparation Example 4) | — | — | — | — |
|  | Liquid dispersion of polymer particulate containing magenta pigment (Preparation Example 5) | — | — | — | — |
|  | Liquid dispersion of polymer particulate containing cyan pigment (Preparation Example 6) | — | — | — | — |
|  | Liquid dispersion of polymer particulate containing yellow pigment (Preparation Example 7) | — | — | — | — |
|  | Liquid dispersion of polymer particulate containing carbon black pigment (Preparation Example 8) | 20.00 | 20.00 | 20.00 | 20.00 |
| Resin particle | Resin including Chemical Formula A | Water-dispersible polyurethane resin A (Preparation Example 1) | — | — | — | — |
|  |  | Water-dispersible polyurethane resin B (Preparation Example 2) | — | — | — | — |
|  |  | Water-dispersible polyurethane resin C (Preparation Example 3) | — | — | — | — |

TABLE 3-continued

| | | | | | |
|---|---|---|---|---|---|
| | | Water-dispersible polyurethane resin D (Preparation Example 4) | 26.00 | 26.00 | 26.00 | 26.00 |
| | Other resins | Polyurethane dispersion "SUPERFLEX ® 300" | — | — | — | — |
| | | Polyurethane dispersion "TAKELAC ™ W-6110" | 1.62 | 1.62 | 1.62 | 1.62 |
| | | Acrylic-silicone polymer particulate A (Preparation Example 5) | 2.40 | 2.40 | 2.40 | 2.40 |
| Organic solvent | Organic solvent 1 | 3-methoxy-N,N-dimethyl propanamide (SP value: 9.19) | 7.50 | 7.50 | 7.50 | — |
| | | 3-n-butoxy-N,N-dimethyl propanamide (SP value: 9.03) | — | — | — | 2.50 |
| | | 3-ethyl-3-hydroxyl methyl oxetane (SP value: 11.31) | 2.50 | 2.50 | 2.50 | — |
| | | 3-methyl-3-hydroxylmethyl oxetane (SP value: 11.79) | — | — | — | — |
| | | Propylene glycol mono-propyl ether (SP value: 9.82) | 3.00 | 3.00 | 3.00 | — |
| | | Propylene glycol mono-butyl ether (SP value: 9.69) | — | — | — | — |
| | | 3-methoxy-1-butanol (SP value: 9.98) | — | — | — | — |
| | | 3-methoxy-3-methyl-1-butanol (SP value: 9.64) | — | — | — | — |
| | | 2-ethyl-1,3-hexanediol (SP value: 10.6) | 2.00 | 2.00 | 2.00 | 1.00 |
| | | 2,2,4-trimethyl-1,3-pentanediol (SP value: 10.8) | — | — | — | — |
| | Organic solvent 2 | Glycerin (SP value: 16.38) | — | — | — | — |
| | | 3-methyl-1,3-butane diol (SP value: 12.05) | — | — | — | 10.00 |
| | | Propylene glycol (SP value: 13.72) | 20.00 | 20.00 | 20.00 | 20.00 |
| Surfactant | | Chemical Formula 8 polyether-modified siloxane compound | — | — | — | — |
| | | Chemical Formula 10 polyether-modified siloxane compound | — | — | — | — |
| | | Chemical Formula 11 polyether-modified siloxane compound | — | — | — | — |
| | | TEGO Wet 270 | 0.50 | 0.50 | 0.50 | 0.50 |
| | | SILFACE SAG503A | 1.00 | 1.00 | 1.00 | 1.00 |
| | | Surfynol 104E (effective component: 50 percent) | — | — | — | — |
| | | Surfynol 420 (effective component: 100 percent) | — | — | — | — |
| | | Olfin EXP.4300 (effective component: 60 percent) | — | — | — | — |
| | | UNIDYNE ™ DSN403N | — | — | — | — |
| Photoacid generator | | Chemical Formula 1 | — | — | — | — |
| | | Chemical Formula 2 | — | — | — | — |
| | | Chemical Formula 5 | — | — | — | — |
| | | Chemical Formula 7 | — | — | — | — |
| | | Chemical Formula 8 | — | — | — | — |
| | | Chemical Formula 9 | — | — | — | — |
| | | Chemical Formula 12 | 5.00 | 0.20 | 5.20 | 2.00 |
| Mildew-proofing agent | | Proxel GXL | 0.05 | 0.05 | 0.05 | 0.05 |
| Foam Inhibitor (Defoaming Agent) | | 2,4,7,9-tetramethyldecane-4,7-diol | 0.40 | 0.40 | 0.40 | 0.40 |

TABLE 3-continued

|  |  |  |  |  |  |
|---|---|---|---|---|---|
|  | 2,5,8,11-tetramethyldodecane-5,8-diol | — | — | — | — |
| pH regulator | 2-amino-2-ethyl-1,3-propane diol | 0.20 | 0.20 | 0.20 | 0.20 |
| Water | Pure water | Balance | Balance | Balance | Balance |
| Total (percent by mass) |  | 100 | 100 | 100 | 100 |

|  |  |  | Example | | | |
|---|---|---|---|---|---|---|
| Component (percent by mass) | | | 18 | 19 | 20 | 21 |
| Coloring material (pigment dispersion) | | Surface reformed black pigment dispersion (Preparation Example 1) | — | — | — | — |
| | | Surface reformed magenta pigment dispersion (Preparation Example 2) | — | — | — | — |
| | | Surface reformed cyan pigment dispersion (Preparation Example 3) | — | — | — | — |
| | | Surface reformed yellow pigment dispersion (Preparation Example 4) | — | — | — | — |
| | | Liquid dispersion of polymer particulate containing magenta pigment (Preparation Example 5) | — | — | — | — |
| | | Liquid dispersion of polymer particulate containing cyan pigment (Preparation Example 6) | — | — | — | — |
| | | Liquid dispersion of polymer particulate containing yellow pigment (Preparation Example 7) | — | — | — | — |
| | | Liquid dispersion of polymer particulate containing carbon black pigment (Preparation Example 8) | 20.00 | 20.00 | 20.00 | 20.00 |
| Resin particle | Resin including Chemical Formula A | Water-dispersible polyurethane resin A (Preparation Example 1) | — | — | — | — |
| | | Water-dispersible polyurethane resin B (Preparation Example 2) | — | — | — | — |
| | | Water-dispersible polyurethane resin C (Preparation Example 3) | — | — | — | — |
| | | Water-dispersible polyurethane resin D (Preparation Example 4) | 26.00 | 26.00 | — | — |
| | Other resins | Polyurethane dispersion "SUPERFLEX® 300" | — | — | — | — |
| | | Polyurethane dispersion "TAKELAC™ W-6110" | 1.62 | 1.62 | — | — |
| | | Acrylic-silicone polymer particulate A (Preparation Example 5) | 2.40 | 2.40 | 12.00 | 12.00 |
| Organic solvent | Organic solvent 1 | 3-methoxy-N,N-dimethyl propanamide (SP value: 9.19) | — | — | 55.00 | 60.00 |
| | | 3-n-butoxy-N,N-dimethyl propanamide (SP value: 9.03) | 2.50 | 5.00 | — | — |
| | | 3-ethyl-3-hydroxyl methyl oxetane (SP value: 11.31) | — | — | — | — |
| | | 3-methyl-3-hydroxylmethyl oxetane (SP value: 11.79) | — | — | — | — |
| | | Propylene glycol mono-propyl ether (SP value: 9.82) | — | — | — | — |

TABLE 3-continued

| | | | | | |
|---|---|---|---|---|---|
| | Propylene glycol mono-butyl ether (SP value: 9.69) | — | — | — | — |
| | 3-methoxy-1-butanol (SP value: 9.98) | — | — | — | — |
| | 3-methoxy-3-methyl-1-butanol (SP value: 9.64) | — | — | 3.00 | — |
| | 2-ethyl-1,3-hexanediol (SP value: 10.6) | 1.00 | — | 2.00 | 2.00 |
| | 2,2,4-trimethyl-1,3-pentanediol (SP value: 10.8) | — | — | — | — |
| Organic solvent 2 | Glycerin (SP value: 16.38) | — | — | — | — |
| | 3-methyl-1,3-butane diol (SP value: 12.05) | 10.00 | 5.00 | — | — |
| | Propylene glycol (SP value: 13.72) | 20.00 | 25.00 | — | — |
| Surfactant | Chemical Formula 8 polyether-modified siloxane compound | — | — | — | — |
| | Chemical Formula 10 polyether-modified siloxane compound | — | — | — | — |
| | Chemical Formula 11 polyether-modified siloxane compound | — | — | — | — |
| | TEGO Wet 270 | 0.50 | 0.50 | 0.5 | 0.50 |
| | SILFACE SAG503A | 1.00 | 1.00 | 1.00 | 1.00 |
| | Surfynol 104E (effective component: 50 percent) | — | — | — | — |
| | Surfynol 420 (effective component: 100 percent) | — | — | — | — |
| | Olfin EXP.4300 (effective component: 60 percent) | — | — | — | — |
| | UNIDYNE™ DSN403N | — | — | — | — |
| generator Photoacid | Chemical Formula 1 | — | — | — | — |
| | Chemical Formula 2 | — | — | — | — |
| | Chemical Formula 5 | — | — | — | — |
| | Chemical Formula 7 | — | — | — | — |
| | Chemical Formula 8 | — | — | — | — |
| | Chemical Formula 9 | — | — | — | — |
| | Chemical Formula 12 | 2.00 | 2.00 | 2.00 | 0.20 |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.40 | 0.40 | 0.40 | 0.40 |
| | 2,5,8,11-tetramethyldodecane-5,8-diol | — | — | — | — |
| pH regulator | 2-amino-2-ethyl-1,3-propane diol | 0.20 | 0.20 | 0.20 | 0.20 |
| Water | Pure water | Balance | Balance | Balance | Balance |
| Total (percent by mass) | | 100 | 100 | 100 | 100 |

TABLE 4

| Component (percent by mass) | | Example 22 |
|---|---|---|
| Coloring material (pigment dispersion) | Surface reformed black pigment dispersion (Preparation Example 1) | — |
| | Surface reformed magenta pigment dispersion (Preparation Example 2) | |

TABLE 4-continued

| | | | |
|---|---|---|---|
| | | Surface reformed cyan pigment dispersion (Preparation Example 3) | — |
| | | Surface reformed yellow pigment dispersion (Preparation Example 4) | — |
| | | Liquid dispersion of polymer particulate containing magenta pigment (Preparation Example 5) | — |
| | | Liquid dispersion of polymer particulate containing cyan pigment (Preparation Example 6) | — |
| | | Liquid dispersion of polymer particulate containing yellow pigment (Preparation Example 7) | — |
| | | Liquid dispersion of polymer particulate containing carbon black pigment (Preparation Example 8) | 20.00 |
| Resin particle | Resin including Chemical Formula A | Water-dispersible polyurethane resin A (Preparation Example 1) | — |
| | | Water-dispersible polyurethane resin B (Preparation Example 2) | — |
| | | Water-dispersible polyurethane resin C (Preparation Example 3) | — |
| | | Water-dispersible polyurethane resin D (Preparation Example 4) | — |
| | Other resins | Polyurethane dispersion "SUPERFLEX ® 300" | — |
| | | Polyurethane dispersion "TAKELAC ™ W-6110" | — |
| | | Acrylic-silicone polymer particulate A (Preparation Example 5) | 12.00 |
| Organic solvent | Organic solvent 1 | 3-methoxy-N,N-dimethyl propanamide (SP value: 9.19) | 60.00 |
| | | 3-n-butoxy-N,N-dimethyl propanamide (SP value: 9.03) | — |
| | | 3-ethyl-3-hydroxyl methyl oxetane (SP value: 11.31) | — |
| | | 3-methyl-3-hydroxylmethyl oxetane (SP value: 11.79) | — |
| | | Propylene glycol mono-propyl ether (SP value: 9.82) | — |
| | | Propylene glycol mono-butyl ether (SP value: 9.69) | — |
| | | 3-methoxy-1-butanol (SP value: 9.98) | — |
| | | 3-methoxy-3-methyl-1-butanol (SP value: 9.64) | — |
| | | 2-ethyl-1,3-hexanediol (SP value: 10.6) | 2.00 |
| | | 2,2,4-trimethyl-1,3-pentanediol (SP value: 10.8) | — |
| | Organic solvent 2 | Glycerin (SP value: 16.38) | — |
| | | 3-methyl-1,3-butane diol (SP value: 12.05) | — |
| | | Propylene glycol (SP value: 13.72) | — |

TABLE 4-continued

| | | |
|---|---|---|
| Surfactant | Chemical Formula 8 polyether-modified siloxane compound | — |
| | Chemical Formula 10 polyether-modified siloxane compound | — |
| | Chemical Formula 11 polyether-modified siloxane compound | — |
| | TEGO Wet 270 | — |
| | SILFACE SAG503A | — |
| | Surfynol 104E (effective component: 50 percent) | — |
| | Surfynol 420 (effective component: 100 percent) | — |
| | Olfin EXP.4300 (effective component: 60 percent) | — |
| | UNIDYNE™ DSN403N | — |
| Photoacid generator | Chemical Formula 1 | — |
| | Chemical Formula 2 | — |
| | Chemical Formula 5 | — |
| | Chemical Formula 7 | — |
| | Chemical Formula 8 | — |
| | Chemical Formula 9 | — |
| | Chemical Formula 12 | 2.00 |
| Mildew-proofing agent | Proxel GXL | 0.05 |
| Foam Inhibitor (Defoaming Agent) | 2,4,7,9-tetramethyldecane-4,7-diol | 0.40 |
| | 2,5,8,11-tetramethyldodecane-5,8-diol | — |
| pH regulator | 2-amino-2-ethyl-1,3-propane diol | 0.20 |
| Water | Pure water | Balance |
| Total (percent by mass) | | 100 |

| | | Comparative Example | | | | |
|---|---|---|---|---|---|---|
| Component (percent by mass) | | 1 | 2 | 3 | 4 | 5 |
| Coloring material (pigment dispersion) | Surface reformed black pigment dispersion (Preparation Example 1) | — | — | — | — | — |
| | Surface reformed magenta pigment dispersion (Preparation Example 2) | — | — | — | — | — |
| | Surface reformed cyan pigment dispersion (Preparation Example 3) | — | — | — | — | — |
| | Surface reformed yellow pigment dispersion (Preparation Example 4) | — | — | — | — | — |
| | Liquid dispersion of polymer particulate containing magenta pigment (Preparation Example 5) | 20.00 | — | — | — | 20.00 |
| | Liquid dispersion of polymer particulate containing cyan pigment (Preparation Example 6) | — | 16.67 | — | — | — |
| | Liquid dispersion of polymer particulate containing yellow pigment (Preparation Example 7) | — | — | 16.67 | — | — |
| | Liquid dispersion of polymer particulate containing carbon black pigment (Preparation Example 8) | — | — | — | 20.00 | — |

TABLE 4-continued

| | | | | | | | |
|---|---|---|---|---|---|---|---|
| Resin particle | Resin including Chemical Formula A | Water-dispersible polyurethane resin A (Preparation Example 1) | 32.00 | — | — | — | 32.00 |
| | | Water-dispersible polyurethane resin B (Preparation Example 2) | — | 24.00 | — | — | — |
| | | Water-dispersible polyurethane resin C (Preparation Example 3) | — | — | 34.00 | — | — |
| | | Water-dispersible polyurethane resin D (Preparation Example 4) | — | — | — | 26.00 | — |
| | Other resins | Polyurethane dispersion "SUPERFLEX® 300" | — | — | 1.67 | — | — |
| | | Polyurethane dispersion "TAKELAC™ W-6110" | 1.62 | 1.62 | — | 1.62 | 1.62 |
| | | Acrylic-silicone polymer particulate A (Preparation Example 5) | — | 3.75 | — | 2.40 | — |
| solvent Organic | Organic solvent 1 | 3-methoxy-N,N-dimethyl propanamide (SP value: 9.19) | — | — | — | 7.50 | — |
| | | 3-n-butoxy-N,N-dimethyl propanamide (SP value: 9.03) | 3.00 | — | — | — | — |
| | | 3-ethyl-3-hydroxyl methyl oxetane (SP value: 11.31) | 5.00 | — | — | 2.50 | — |
| | | 3-methyl-3-hydroxylmethyl oxetane (SP value: 11.79) | — | — | — | — | — |
| | | Propylene glycol mono-propyl ether (SP value: 9.82) | — | — | — | 3.00 | — |
| | | Propylene glycol mono-butyl ether (SP value: 9.69) | — | — | — | — | — |
| | | 3-methoxy-1-butanol (SP value: 9.98) | 3.00 | — | — | — | — |
| | | 3-methoxy-3-methyl-1-butanol (SP value: 9.64) | — | — | — | — | — |
| | | 2-ethyl-1,3-hexanediol (SP value: 10.6) | — | — | — | 2.00 | — |
| | | 2,2,4-trimethyl-1,3-pentanediol (SP value: 10.8) | 2.00 | — | — | — | — |
| | Organic solvent 2 | Glycerin (SP value: 16.38) | — | 5.00 | 5.00 | — | 5.00 |
| | | 3-methyl-1,3-butane diol (SP value: 12.05) | — | 15.00 | 15.00 | — | 10.00 |
| | | Propylene glycol (SP value: 13.72) | 20.00 | 20.00 | 18.00 | 20.00 | 20.00 |
| Surfactant | | Chemical Formula 8 polyether-modified siloxane compound | — | — | — | — | — |
| | | Chemical Formula 10 polyether-modified siloxane compound | — | — | — | — | — |
| | | Chemical Formula 11 polyether-modified siloxane compound | — | — | — | — | — |
| | | TEGO Wet 270 | 1.00 | — | 0.50 | 0.50 | 1.00 |
| | | SILFACE SAG503A | — | 2.00 | 1.00 | 1.00 | — |
| | | Surfynol 104E (effective component: 50 percent) | — | — | — | — | — |
| | | Surfynol 420 (effective component: 100 percent) | — | — | — | — | — |
| | | Olfin EXP.4300 (effective component: 60 percent) | — | — | — | — | — |
| | | UNIDYNE™ DSN403N | — | — | — | — | — |
| Photoacid generator | | Chemical Formula 1 | — | — | — | — | — |
| | | Chemical Formula 2 | — | — | — | — | — |
| | | Chemical Formula 5 | — | — | — | — | — |
| | | Chemical Formula 7 | — | — | — | — | — |
| | | Chemical Formula 8 | — | — | — | — | — |
| | | Chemical Formula 9 | — | — | — | — | — |
| | | Chemical Formula 12 | — | 0.10 | 0.10 | — | — |

TABLE 4-continued

| | | | | | | |
|---|---|---|---|---|---|---|
| Mildew-proofing agent | Proxel GXL | 0.05 | 0.05 | 0.05 | 0.05 | 0.05 |
| Foam Inhibitor (Defoaming Agent) | 2,4,7,9-tetramethyldecane-4,7-diol | — | 0.40 | 0.40 | 0.40 | — |
| | 2,5,8,11-tetramethyldodecane-5,8-diol | 0.40 | — | — | — | 0.40 |
| pH regulator | 2-amino-2-ethyl-1,3-propane diol | 0.20 | 0.20 | 0.30 | 0.20 | 0.20 |
| Water | Pure water | Balance | Balance | Balance | Balance | Balance |
| Total (percent by mass) | | 100 | 100 | 100 | 100 | 100 |

Details of the components, abbreviations, and others shown in Tables 1 to 4 are as follows:

Resin

SUPER FLEX 300: Polyurethane resin dispersion (solid portion: 30.0 percent by mass, glass transition temperature (Tg): −42 degrees C., manufactured by DKS Co., Ltd.)

TAKELAC™ W-6110: Polyurethane dispersion, solid portion 30.9 percent by mass, Tg=−20 degrees C., manufactured by Mitsui Chemicals, Inc.)

Surfactant

TEGO Wet 270 (polyether-modified siloxane compound (manufactured by Evonik Industries AG, effective component: 100 percent)

SILFACE SAG503A: (polyether-modified siloxane compound (effective component: 100 percent, manufactured by Nisshin Chemical Co., Ltd.)

Surfynol 104E (effective component: 50 percent, manufactured by Nissin Chemical co., ltd.)

Surfynol 420 (effective component: 100 percent, manufactured by Nissin Chemical co., ltd.)

OLFINE® EXP.430 (effective component: 60 percent, manufactured by Nissin Chemical co., ltd.)

UNIDYNE™ DSN403N: Polyoxyethylene perfluoroalkyl ether (effective component: 100 percent, manufactured by DAIKIN INDUSTRIES, LTD.)

PROXEL GXL: Preservatives and fungicides composed of 1,2-benzisothiazolin-3-one as a major component (component: 20 percent by mass, containing dipropylene glycol, manufactured by Avecia Inkjet Limited)

Properties of each ink of Examples 1 to 22 and Comparative Examples 1 to 5 were evaluated in the following manner. The results are shown in Table 5.

Viscosity of Ink

The viscosity of the ink was measured by a viscometer (RE-85L, manufactured by TOKI SANGYO CO., LTD.) at 25 degrees C.

pH of Ink pH of the ink was measured at 25 degrees C. using a pH meter (HM-30R type, manufactured by DKK-TOA CORPORATION).

Static Surface Tension of Ink

Static surface tension of each ink was measured at 25 degrees C. using an automatic surface tensiometer (DY-300, manufactured by KYOWA INTERFACE SCIENCE Co., Ltd.).

Dynamic Surface Tension of Ink

Dynamic surface tension of the ink was measured at 25 degrees C. at a surface life time of 15 msec by SITA DynoTester (manufactured by SITA Messtechnik GmbH) as measured by maximum bubble pressure technique.

TABLE 5

| | Proportion of photoacid generator (percent by mass) | Proportion of organic solvent 1 (percent by mass) | Ink Property values | | | |
|---|---|---|---|---|---|---|
| | | | Viscosity (mPa · s) | pH | Static surface tension (mN/m) | 15 msec dynamic surface tension (mN/m) |
| Example 1 | 1.00 | 67.0 | 9.60 | 9.13 | 20.5 | 32.8 |
| Example 2 | 1.50 | 14.5 | 9.42 | 9.22 | 21.0 | 32.1 |
| Example 3 | 2.00 | 14.0 | 9.55 | 9.07 | 21.5 | 32.9 |
| Example 4 | 3.00 | 10.0 | 9.33 | 9.31 | 20.9 | 31.7 |
| Example 5 | 0.50 | 10.0 | 9.14 | 9.36 | 20.7 | 31.4 |
| Example 6 | 2.50 | 13.0 | 9.49 | 8.99 | 20.7 | 30.9 |
| Example 7 | 2.50 | 16.0 | 9.34 | 9.02 | 21.6 | 32.6 |
| Example 8 | 1.00 | 16.0 | 9.63 | 9.23 | 20.8 | 30.7 |
| Example 9 | 2.00 | 15.0 | 9.42 | 9.05 | 22.7 | 33.3 |
| Example 10 | 2.00 | 15.0 | 9.01 | 9.16 | 24.8 | 31.9 |
| Example 11 | 2.50 | 15.0 | 9.13 | 9.04 | 27.2 | 32.2 |
| Example 12 | 3.00 | 15.0 | 9.02 | 9.09 | 25.5 | 31.4 |
| Example 13 | 1.00 | 27.0 | 9.33 | 9.11 | 22.9 | 29.8 |
| Example 14 | 0.25 | 15.0 | 9.38 | 9.07 | 22.5 | 33.1 |
| Example 15 | 5.00 | 15.0 | 9.47 | 9.04 | 23.0 | 33.6 |
| Example 16 | 0.20 | 15.0 | 9.40 | 9.06 | 22.5 | 33.0 |
| Example 17 | 5.20 | 15.0 | 9.48 | 9.09 | 23.1 | 33.8 |
| Example 18 | 2.00 | 3.5 | 9.10 | 9.05 | 22.2 | 32.7 |
| Example 19 | 2.00 | 5.0 | 9.15 | 9.03 | 22.3 | 32.9 |
| Example 20 | 2.00 | 60.0 | 10.34 | 9.09 | 23.6 | 33.6 |
| Example 21 | 0.20 | 62.0 | 10.42 | 9.03 | 23.9 | 34.1 |
| Example 22 | 0.20 | 62.0 | 10.25 | 9.10 | 44.7 | 49.2 |

TABLE 5-continued

|  | Ink Property values | | | | |
|---|---|---|---|---|---|
|  | Proportion of photoacid generator (percent by mass) | Proportion of organic solvent 1 (percent by mass) | Viscosity (mPa·s) | pH | Static surface tension (mN/m) | 15 msec dynamic surface tension (mN/m) |
|---|---|---|---|---|---|---|
| Comparative Example 1 | 0.00 | 13.0 | 9.45 | 9.01 | 20.6 | 30.6 |
| Comparative Example 2 | 0.10 | 0.0 | 9.14 | 9.07 | 21.2 | 32.2 |
| Comparative Example 3 | 0.10 | 0.0 | 9.33 | 9.25 | 20.6 | 30.4 |
| Comparative Example 4 | 0.00 | 15.0 | 9.39 | 9.07 | 22.5 | 33.1 |
| Comparative Example 5 | 0.00 | 0.0 | 9.17 | 9.08 | 22.3 | 32.7 |

Each ink was evaluated on storage stability in the following manner. The results are shown in Table 6.

Storage Stability of Ink

Viscosity of each ink was measured by measuring the viscosity of the ink at 25 degrees C. before storage and that of the ink stored in a sealed container at 60 degrees C. for seven days at 25 degrees C. by a viscometer (RE-85L, manufactured by TOKI SANGYO CO., LTD.). The viscosity change rate was obtained from the following relationship and evaluated according to the following criteria.

Change rate of viscosity (%)=(Viscosity of ink after storage−Viscosity of ink before storage)/(Viscosity of ink before storage)×100     Relationship 1

Evaluation Criteria

A: 95 to 105 percent

B: Greater than 90 percent to less than 95 percent and greater than 105 percent to less than 110 percent P: 90 percent or less and 110 percent or greater Image Forming A remodeled inkjet printer based on RICOH Pro L4160 (manufactured by Ricoh Co., Ltd., UV irradiator of metal halide lamp) was set in such a manner that the drive voltage of the piezoelectric elements was varied to equalize the amount of ink discharged, thereby attaching the same amount of ink to a recording medium under the condition of a temperature range of from 22.5 to 2.5 degrees C. and 45 to 55 percent RH.

The remodeled printer was filled with each of the prepared ink. The chart including 24 point general symbols of JIS X 0208 (1997), 2223 created by using Microsoft Word 2000 (manufactured by Microsoft Corporation) was turned into data with PHOTOSHOP™ without color calibration. The printer printed the data on a vinyl chloride medium (NIJ-PVCM, available from PANACEA) with 600 dpi×600 dpi and exposed the medium to UV radiation (320 to 390 nm with an integral light of 1450 mJ/cm$^2$) at the same time, followed by drying with a drier at 70 degrees C. for two minutes.

Incidentally, the symbols of JIS X 0208 (1997), 2223 had squares for the exterior and the inside thereof was entirely painted by ink.

Each prepared image was evaluated on image density, beading, and fixability (abrasion resistance) in the following manner. The results are shown in Table 6.

Image Density

Each obtained image was subjected to measuring the image density of the solid portion with a spectrophotometer (X-rite exact, manufactured by X-rite Inc.) and evaluated according to the following criteria. A- or B-graded ink is usable for practical purpose.

Evaluation Criteria

A: Black: 2.5 or greater

Yellow: 1.2 or greater

Magenta: 1.9 or greater

Cyan: 2.3 or greater

B: Black: 2.2 to less than 2.5

Yellow: 1.1 to less than 1.2

Magenta: 1.75 to less than 1.9

Cyan: 2.1 to less than 2.3

C: Black: 2.0 to less than 2.2

Yellow: 1.0 to less than 1.1

Magenta: 1.6 to less than 1.75

Cyan: 1.9 to less than 2.1

D: Black: less than 2.0

Yellow: less than 1.0

Magenta: less than 1.6

Cyan: less than 1.9

Beading

A solid image was printed with each ink on the vinyl chloride medium under the same condition as in Image Density. Beading (non-uniform density) on the solid image portion was visually checked and evaluated according to the following criteria. A- or B-graded ink is usable for practical purpose.

Evaluation Criteria

A: Uniform

B: Slightly non-uniform

C: Non-uniform

D: Severely non-uniform

Fixability (Abrasion Resistance)

A solid image was printed with each ink on the vinyl chloride medium under the same condition as in Image Density. Thereafter, the solid portion was abraded by dried cotton (unbleached muslin No. 3) under a load of 400 g and evaluated about abrasion (friction) resistance according to the following criteria: A- or B-graded ink is usable for practical purpose.

Evaluation Criteria

A: No change in image when abraded 100+ times

B: Slight scratch observed when abraded 100 times but causing no impact on image density C: Image density degraded while abraded 100 times D: Image density degraded while abraded 50− times

TABLE 6

| | Image Density | Beading (uneven density) | Ink storage stability | Fixability (Abrasion Resistance) |
|---|---|---|---|---|
| Example 1 | B | A | A | B |
| Example 2 | A | A | A | A |
| Example 3 | A | A | B | A |
| Example 4 | A | A | A | A |
| Example 5 | A | A | A | A |
| Example 6 | A | A | B | A |
| Example 7 | A | A | A | A |
| Example 8 | A | A | B | A |
| Example 9 | A | A | A | A |
| Example 10 | A | A | A | B |
| Example 11 | A | A | A | B |
| Example 12 | B | A | A | A |
| Example 13 | B | A | A | A |
| Example 14 | A | B | A | A |
| Example 15 | A | A | B | B |
| Example 16 | A | B | A | A |
| Example 17 | A | A | B | B |
| Example 18 | B | A | A | B |
| Example 19 | A | A | B | A |
| Example 20 | A | A | A | B |
| Example 21 | B | B | A | B |
| Example 22 | B | B | A | B |
| Comparative Example 1 | A | C | B | A |
| Comparative Example 2 | C | B | A | B |
| Comparative Example 3 | C | B | A | B |
| Comparative Example 4 | B | C | A | A |
| Comparative Example 5 | C | D | A | C |

Examples 23 to 35 and Comparative Examples 6 to 7

Color bleeding was evaluated in the following manner using each ink set shown in Table 7. The results are shown in Table 7.

Color Bleeding

A solid image was printed with each ink set on the vinyl chloride medium under the same condition as in Image Density. Another solid image of a color different color than the ink to be evaluated was printed adjacent to the portion of the solid image of the ink to be evaluated for color bleeding. When the ink to be evaluated was black, yellow ink was printed at the adjacent portion. When the ink to be evaluated was cyan, magenta ink was printed at the adjacent portion. Whether color bleeding (color boundary blurring) occurred was visually checked and evaluated on the degree of color bleeding according to the following criteria.

Evaluation Criteria
A: No color bleeding at color boundary
B: Slight color bleeding at color boundary
C: Color bleeding at color boundary
D: Severe color bleeding at color boundary

TABLE 7

| | Ink set | Color bleeding (Color boundary blurring) |
|---|---|---|
| Example 23 | Example 2, 3, 4, and 5 | A |
| Example 24 | Example 6, 7, 8, and 9 | A |
| Example 25 | Example 1, 6, 7, and 8 | B |
| Example 26 | Example 10, 11, 12, and 13 | A |
| Example 27 | Example 6, 7, 8, and 14 | A |

TABLE 7-continued

| | Ink set | Color bleeding (Color boundary blurring) |
|---|---|---|
| Example 28 | Example 6, 7, 8, and 15 | A |
| Example 29 | Example 6, 7, 8, and 16 | B |
| Example 30 | Example 6, 7, 8, and 17 | A |
| Example 31 | Example 6, 7, 8, and 18 | A |
| Example 32 | Example 6, 7, 8, and 19 | A |
| Example 33 | Example 6, 7, 8, and 20 | A |
| Example 34 | Example 6, 7, 8, and 21 | B |
| Example 35 | Example 6, 7, 8, and 22 | B |
| Comparative Example 6 | Comparative Examples 1, 2, 3, and 4 | C |
| Comparative Example 7 | Comparative Examples 2, 3, 4, and 5 | D |

Aspects of the present disclosure are, for example, as follows.

(1) An ink that contains an anionic compound, water, and a photoacid generator, and one or more organic solvents containing at least one organic solvent having a solubility parameter of from 9 to 11.8 $(J/cm^3)^{1/2}$.

(2). The ink according to (1), wherein the proportion of the at least one organic solvent in the ink is from 5 to 60 percent by mass.

(3). The ink according to (1) or (2) mentioned above, wherein the photoacid generator is represented by Chemical Formula I or Chemical Formula II below.

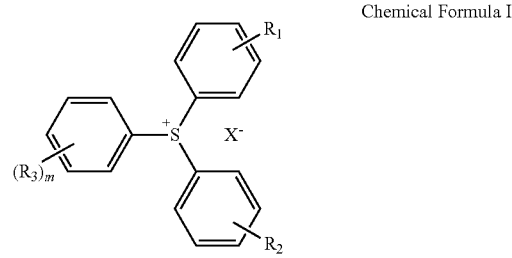

Chemical Formula I

In Chemical Formula I, $R_1$, $R_2$, and $R_3$ each, independently represent hydrogen atoms, alkyl groups having one to four carbon atoms, alkoxy groups having one to four carbon atoms, or thiophenyl groups, and m represents zero or an integer of from 1 to 3. The counter ion X-represents $F_3CSO_3^-$, $F_9C_4SO_3^-$, $CH_3C_6H_4SO_3^-$, $PF_6^-$, $SbF_6^-$, $(Rf)PF_{6-n}^-$, 10-camphor $SO_3^-$, or $B(C_6F_5)_4^-$, where Rf represents a fluoroalkyl carbide group and n represents an integer of from 1 to 5.

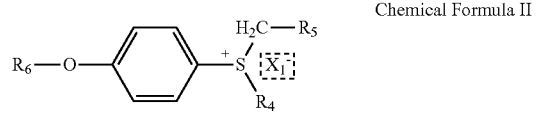

Chemical Formula II

In Chemical Formula II, $R_4$ represents a hydrogen atom or alkyl group having 1 to 4 carbon atoms. $R_5$ represents a hydrogen atom, an alkyl group having one to four carbon atoms, a phenyl group, a substituted phenyl group, or a naphthalene group. $R_6$ represents a hydrogen atom, an alkyl group having one to four carbon atoms, an acetyl group, or a methoxy carbonyl group. The counter ion $X_1^-$ represents $PF_6^-$, $SbF_6^-$, or $B(C_6F_5)_4^-$.

(4). The ink for inkjet according to any one of (1) to (3) mentioned above, wherein the proportion of the photoacid generator in the ink is from 0.25 to 5 percent by mass.

(5). The ink according to any one of (1) to (4), wherein the anionic compound contains at least one of an anionic resin and an anionic pigment.

(6). The ink according to any one of (1) to (5) mentioned above, further includes a surfactant.

(7). The ink according to (6) mentioned above, wherein the surfactant contains at least one member selected from the group consisting of a polyether-modified siloxane compound, an acetylene glycol surfactant, and an acetylene alcohol surfactant.

(8). An ink set containing at least two inks selected from the group consisting of a cyan ink, a magenta ink, a yellow ink, and black ink, wherein each of the cyan ink, the magenta ink, the yellow ink, and the black ink is the ink of any one of (1) to (7) mentioned above.

(9). An ink container that includes the ink of any one of (1) to (7) mentioned above and an ink accommodating unit accommodating the ink.

(10). A method of printing that includes applying the ink of any one of (1) to (7) mentioned above and exposing the ink to ultraviolet radiation after the ink is applied.

(11). A printing device that includes a device configured to apply the ink of any one of (1) to (7) mentioned above and an ultraviolet irradiator configured to expose the ink to ultraviolet radiation.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink, comprising:
   an anionic compound;
   water;
   a photoacid generator; and
   30 to 60 percent by mass of one or more organic solvents comprising at least one organic solvent having a solubility parameter of from 9 to 11.8 $(J/cm^3)^{1/2}$.

2. The ink according to claim 1, wherein the photoacid generator comprises at least one member selected from the group consisting of a compound represented by Chemical Formula I and Chemical Formula II below,

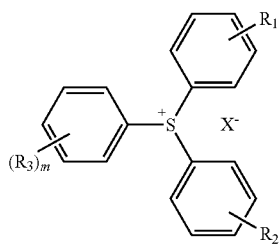

Chemical Formula I where $R_1$, $R_2$, and $R_3$ each, independently represent hydrogen atoms, alkyl groups having one to four carbon atoms, alkoxy groups having one to four carbon atoms, or thiophenyl groups, m represents zero or an integer of from 1 to 3, a counter ion $X^-$ represents $F_3CSO_3^-$, $F_9C_4SO_3^-$, $CH_3C_6H_4SO_3^-$, $PF_6^-$, $SbF_6^-$, $(Rf)_nPF_6^-$, 10-camphor $SO_3^-$, or $B(C_6F_5)_4^-$, where Rf represents a fluoroalkyl carbide group and n represents an integer of from 1 to 5,

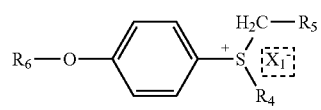

Chemical Formula II where $R_4$ represents a hydrogen atom or an alkyl group having one to four carbon atoms, $R_5$ represents a hydrogen atom, an alkyl group having one to four carbon atoms, a phenyl group, a substituted phenyl group, or a naphthalene group, $R_6$ represents a hydrogen atom, an alkyl group having one to four carbon atoms, an acetyl group, or a methoxy carbonyl group, and a counter ion $X_1^-$ represents $PF_6^-$, $SbF_6^-$, or $B(C_6F_5)_4^-$.

3. The ink according to claim 1, wherein a proportion of the photoacid generator in the ink is from 0.25 to 5 percent by mass in the ink.

4. The ink according to claim 1, wherein the anionic compound comprises at least one member selected from the group consisting of an anionic resin and an anionic pigment.

5. The ink according to claim 1, further comprising a surfactant.

6. The ink according to claim 5, wherein the surfactant comprises at least one member selected from the group consisting of a polyether-modified siloxane compound, an acetylene glycol surfactant, and an acetylene alcohol surfactant.

7. An ink set, comprising:
   at least two inks selected from the group consisting of a cyan ink, a magenta ink, a yellow ink, and black ink, wherein each of the cyan ink, the magenta ink, the yellow ink, and the black ink is the ink of claim 1.

8. An ink container, comprising:
   a UV protection container; and
   the ink of claim 1 accommodated in the UV protection container.

9. A method of printing, comprising:
   applying the ink of claim 1; and
   exposing the ink to ultraviolet radiation after the applying.

10. A printing device, comprising:
    an application device configured to apply the ink of claim 1; and
    an ultraviolet irradiator configured to expose the ink to ultraviolet radiation.

11. The ink according to claim 1, wherein said one or more organic solvents is selected from the group consisting of 3-ethyl-3-oxetane methanol, 3-methyl-3-oxetane methanol, 3-methoxy-N,N-dimethyl propionamide, 3-butoxy-N,N-dimethyl propionamide, 1,2-hexane diol, 2-ethyl-1,3-hexane diol, 2,2,4-trimethylol-1,3-pentane diol, diethylene glycol monoethyl ether, 3-methoxy-1-butanol, 3-methoxy-3-methyl-1-butanol, 3-methoxy-3-methyl-1-butanol, methyl propylene triglycol, diethylene glycol mono-n-butyl ether, diethylene glycol monomethylether, triethylene glycol monomethylether, propylene glycol monopropylether, propylene glycol monomethylether, propylene glycol monobutylether, 3-methoxy-1-butanol, 3-methoxy-1-propanol, dipropylene glycol monomethylether, and 3-methyl-1,5-pentane diol.

12. The ink according to claim 1, wherein said anionic compound is an anionic resin.

13. The ink according to claim 1, wherein said anionic compound is an anionic pigment.

14. The ink according to claim 12, wherein said anionic resin is a water-dispersible resin.

15. The ink according to claim 14, wherein said water-dispersible resin has a glass transition temperature of −30° C. or higher.

16. The ink according to claim 12, wherein said anionic resin is present in an amount of 0.5 to 20% by mass.

17. The ink according to claim 5, wherein said surfactant decreases a dynamic surface tension of said in to 34.0 mN/m or less at a surface life of 15 msec.

\* \* \* \* \*